United States Patent
Alsayed et al.

(10) Patent No.: US 9,410,007 B2
(45) Date of Patent: Aug. 9, 2016

(54) PROCESS FOR MAKING SILVER NANOSTRUCTURES AND COPOLYMER USEFUL IN SUCH PROCESS

(71) Applicant: Rhodia Operations, Aubervilliers (FR)

(72) Inventors: Ahmed Alsayed, Cherry Hill, NJ (US); Lawrence Hough, Philadelphia, PA (US); Chantal Badre, Guttenberg, NJ (US)

(73) Assignee: RHODIA OPERATIONS, Paris (FR)

( * ) Notice: Subject to any disclaimer, the term of this patent is extended or adjusted under 35 U.S.C. 154(b) by 158 days.

(21) Appl. No.: 14/040,365

(22) Filed: Sep. 27, 2013

(65) Prior Publication Data

US 2014/0178246 A1    Jun. 26, 2014

Related U.S. Application Data

(60) Provisional application No. 61/706,280, filed on Sep. 27, 2012.

(51) Int. Cl.
*B22F 9/24* (2006.01)
*C08F 226/10* (2006.01)
*B22F 9/18* (2006.01)

(52) U.S. Cl.
CPC .............. *C08F 226/10* (2013.01); *B22F 9/18* (2013.01)

(58) Field of Classification Search
None
See application file for complete search history.

(56) References Cited

U.S. PATENT DOCUMENTS

| | | |
|---|---|---|
| 3,288,770 A | 11/1966 | Butler |
| 4,347,339 A | 8/1982 | Boevink et al. |
| 5,064,730 A | 11/1991 | Takano et al. |
| 5,470,910 A | 11/1995 | Spanhel et al. |
| 6,011,160 A | 1/2000 | Malawer et al. |
| 6,124,415 A | 9/2000 | Malawer et al. |
| 6,440,637 B1 | 8/2002 | Choi et al. |
| 6,649,138 B2 | 11/2003 | Adams et al. |
| 6,716,895 B1 | 4/2004 | Terry |
| 6,720,240 B2 | 4/2004 | Gole et al. |
| 6,862,396 B2 | 3/2005 | Dickson et al. |
| 7,052,765 B2 | 5/2006 | Lin et al. |

(Continued)

FOREIGN PATENT DOCUMENTS

| | | |
|---|---|---|
| DE | 102007018540 | 10/2008 |
| JP | 2003191420 | 7/2003 |

(Continued)

OTHER PUBLICATIONS

The Nobel Prize in Chemistry, 2000: Conductive Polymers.
(Continued)

*Primary Examiner* — George Wyszomierski

(57) ABSTRACT

A process for making silver nanostructures, which includes the step of reacting at least one polyol and at least one silver compound that is capable of producing silver metal when reduced, in the presence of: (a) a source of chloride or bromide ions, and (b) at least one copolymer that comprises: (i) one or more first constitutional repeating units that each independently comprise at least one pendant saturated or unsaturated, five-, six-, or seven-membered, acylamino- or diacylamino-containing heterocylic ring moiety per constitutional repeating unit, and (ii) one or more second constitutional repeating units, each of which independently differs from the one or more first nonionic constitutional repeating units, and has a molecular weight of greater than or equal to about 500 grams per mole, is described herein.

6 Claims, 12 Drawing Sheets

(56) References Cited

U.S. PATENT DOCUMENTS

| | | |
|---|---|---|
| 7,067,341 B2 | 6/2006 | Mascolo et al. |
| 7,128,881 B2 | 10/2006 | Petrik |
| 7,410,650 B2 | 8/2008 | Lin |
| 7,410,752 B2 | 8/2008 | Fujiwara |
| 7,494,704 B2 | 2/2009 | Massa et al. |
| 7,547,931 B2 | 6/2009 | Star et al. |
| 7,550,611 B2 | 6/2009 | Xu et al. |
| 7,582,330 B2 | 9/2009 | Sahouani |
| 7,585,349 B2 | 9/2009 | Xia et al. |
| 7,632,425 B1 | 12/2009 | Simone et al. |
| 7,704,553 B2 | 4/2010 | Watson et al. |
| 7,718,094 B2 | 5/2010 | Alexandridis et al. |
| 7,745,498 B2 | 6/2010 | Pereira et al. |
| 7,820,840 B2 | 10/2010 | Linic et al. |
| 7,824,466 B2 * | 11/2010 | Vanheusden et al. ......... 75/362 |
| 7,846,412 B2 | 12/2010 | Nie et al. |
| 7,868,351 B2 | 1/2011 | Taniguchi et al. |
| 7,914,850 B2 | 3/2011 | Elbahri et al. |
| 7,922,787 B2 | 4/2011 | Wang et al. |
| 8,029,700 B2 | 10/2011 | Wei et al. |
| 8,052,773 B2 | 11/2011 | Takada |
| 8,084,273 B2 | 12/2011 | Mirkin et al. |
| 8,088,437 B2 | 1/2012 | Lee et al. |
| 8,114,187 B2 | 2/2012 | Xia et al. |
| 8,158,137 B2 | 4/2012 | Bignozzi et al. |
| 8,178,120 B2 | 5/2012 | Vandesteeg et al. |
| 8,257,866 B2 | 9/2012 | Loveness et al. |
| 8,280,214 B2 | 10/2012 | Yang et al. |
| 8,282,860 B2 | 10/2012 | Chung et al. |
| 8,310,009 B2 | 11/2012 | Saran et al. |
| 8,349,467 B2 | 1/2013 | Naoi |
| 8,361,553 B2 | 1/2013 | Karandikar et al. |
| 8,388,870 B2 | 3/2013 | Sano et al. |
| 8,420,717 B2 | 4/2013 | Khabashesku et al. |
| 2003/0049300 A1 | 3/2003 | Terry et al. |
| 2004/0127637 A1 | 7/2004 | Hsu et al. |
| 2004/0157971 A1 | 8/2004 | Kim |
| 2005/0008676 A1* | 1/2005 | Qiu et al. ............ 424/429 |
| 2005/0113936 A1 | 5/2005 | Brustad et al. |
| 2005/0130258 A1 | 6/2005 | Trent et al. |
| 2005/0229744 A1 | 10/2005 | Kijima |
| 2006/0035179 A1 | 2/2006 | Oyamada |
| 2006/0035180 A1 | 2/2006 | Mori |
| 2006/0057502 A1 | 3/2006 | Okada et al. |
| 2006/0065075 A1 | 3/2006 | Chang et al. |
| 2006/0068025 A1 | 3/2006 | Chang et al. |
| 2006/0068026 A1 | 3/2006 | Hu et al. |
| 2006/0115536 A1 | 6/2006 | Yacaman et al. |
| 2006/0196309 A1 | 9/2006 | Niidome et al. |
| 2006/0240218 A1 | 10/2006 | Parce |
| 2006/0248619 A1 | 11/2006 | Fujita |
| 2007/0056402 A1 | 3/2007 | Cho et al. |
| 2007/0074316 A1 | 3/2007 | Alden et al. |
| 2007/0190323 A1 | 8/2007 | Lee et al. |
| 2007/0275259 A1 | 11/2007 | Lee et al. |
| 2008/0003130 A1 | 1/2008 | Xia et al. |
| 2008/0083299 A1 | 4/2008 | Simone et al. |
| 2008/0085962 A1 | 4/2008 | Simone et al. |
| 2008/0095705 A1 | 4/2008 | Virtanen et al. |
| 2008/0102122 A1 | 5/2008 | Mahadevan et al. |
| 2008/0181931 A1 | 7/2008 | Qiu et al. |
| 2008/0210052 A1* | 9/2008 | Allemand ............ 75/300 |
| 2008/0227766 A1 | 9/2008 | Wunder et al. |
| 2008/0231798 A1 | 9/2008 | Zhou et al. |
| 2008/0241391 A1 | 10/2008 | Kim et al. |
| 2008/0245186 A1 | 10/2008 | Yang et al. |
| 2008/0259262 A1 | 10/2008 | Jones et al. |
| 2009/0074705 A1 | 3/2009 | Graham et al. |
| 2009/0104114 A1 | 4/2009 | Tamarkin et al. |
| 2009/0129004 A1 | 5/2009 | Gruner |
| 2009/0130433 A1 | 5/2009 | Takada |
| 2009/0148484 A1 | 6/2009 | Lin et al. |
| 2009/0149583 A1 | 6/2009 | Lin et al. |
| 2009/0171106 A1 | 7/2009 | Virtanen et al. |
| 2009/0196788 A1 | 8/2009 | Wang et al. |
| 2009/0225310 A1 | 9/2009 | Yang et al. |
| 2009/0242231 A1 | 10/2009 | Miyagisima et al. |
| 2009/0311530 A1 | 12/2009 | Hirai et al. |
| 2010/0003316 A1 | 1/2010 | Vo Dinh et al. |
| 2010/0016783 A1 | 1/2010 | Bourke et al. |
| 2010/0059443 A1 | 3/2010 | Brellisford et al. |
| 2010/0078070 A1 | 4/2010 | Hosoya et al. |
| 2010/0078197 A1 | 4/2010 | Miyagishima et al. |
| 2010/0078602 A1 | 4/2010 | Hosoya et al. |
| 2010/0096002 A1 | 4/2010 | Hayashi et al. |
| 2010/0101637 A1 | 4/2010 | Yamasaki et al. |
| 2010/0104652 A1 | 4/2010 | Biris et al. |
| 2010/0120960 A1 | 5/2010 | Lee et al. |
| 2010/0126582 A1 | 5/2010 | Yamasaki et al. |
| 2010/0129949 A1 | 5/2010 | Chen et al. |
| 2010/0148132 A1 | 6/2010 | Jiang et al. |
| 2010/0154591 A1 | 6/2010 | Islam |
| 2010/0166952 A1 | 7/2010 | Chiou et al. |
| 2010/0180413 A1 | 7/2010 | Jeong |
| 2010/0181106 A1 | 7/2010 | Delfeld et al. |
| 2010/0224026 A1 | 9/2010 | Brennan et al. |
| 2010/0242679 A1 | 9/2010 | Yu et al. |
| 2010/0255323 A1 | 10/2010 | Nakamura et al. |
| 2010/0258784 A1 | 10/2010 | Lukin et al. |
| 2010/0264378 A1 | 10/2010 | Naoi et al. |
| 2010/0307792 A1 | 12/2010 | Allemand et al. |
| 2011/0003069 A1 | 1/2011 | Ho et al. |
| 2011/0009542 A1 | 1/2011 | Gong et al. |
| 2011/0011208 A1 | 1/2011 | Lin et al. |
| 2011/0014550 A1 | 1/2011 | Jiang et al. |
| 2011/0021970 A1 | 1/2011 | Vo Dinh et al. |
| 2011/0024159 A1 | 2/2011 | Allemand et al. |
| 2011/0031001 A1 | 2/2011 | Ishikawa et al. |
| 2011/0052671 A1 | 3/2011 | Zasadzinski et al. |
| 2011/0052926 A1 | 3/2011 | Nakamura et al. |
| 2011/0081546 A1 | 4/2011 | Kim et al. |
| 2011/0088511 A1 | 4/2011 | Jalaledin et al. |
| 2011/0100476 A1 | 5/2011 | Park et al. |
| 2011/0108523 A1 | 5/2011 | Yang et al. |
| 2011/0117202 A1 | 5/2011 | Bourke et al. |
| 2011/0129536 A1 | 6/2011 | Donati et al. |
| 2011/0132144 A1 | 6/2011 | Mezger et al. |
| 2011/0142899 A1 | 6/2011 | Lagaron Abello et al. |
| 2011/0162870 A1 | 7/2011 | Markovich et al. |
| 2011/0174190 A1 | 7/2011 | Sepa et al. |
| 2011/0180133 A1 | 7/2011 | Verhaverbeke et al. |
| 2011/0180764 A1 | 7/2011 | Takahashi et al. |
| 2011/0185853 A1 | 8/2011 | Wang et al. |
| 2011/0203414 A1 | 8/2011 | Tan et al. |
| 2011/0204319 A1 | 8/2011 | Virkar et al. |
| 2011/0217451 A1 | 9/2011 | Veerasamy |
| 2011/0218304 A1 | 9/2011 | Shi |
| 2011/0219913 A1 | 9/2011 | Suh et al. |
| 2011/0263920 A1 | 10/2011 | Bourke et al. |
| 2011/0291032 A1 | 12/2011 | Sun et al. |
| 2011/0291315 A1 | 12/2011 | Roberts et al. |
| 2011/0303885 A1 | 12/2011 | Vanheusden et al. |
| 2011/0313059 A1 | 12/2011 | Blosi et al. |
| 2012/0018200 A1 | 1/2012 | Kim et al. |
| 2012/0024572 A1 | 2/2012 | Naoi et al. |
| 2012/0031460 A1 | 2/2012 | Hosoya et al. |
| 2012/0032121 A1 | 2/2012 | Higashimura et al. |
| 2012/0037041 A1 | 2/2012 | Nolte et al. |
| 2012/0053319 A1 | 3/2012 | Reguera et al. |
| 2012/0061625 A1 | 3/2012 | Eckert |
| 2012/0063948 A1 | 3/2012 | Ramsden et al. |
| 2012/0088240 A1 | 4/2012 | Baker et al. |
| 2012/0107598 A1 | 5/2012 | Zou et al. |
| 2012/0107600 A1 | 5/2012 | Zou |
| 2012/0107952 A1 | 5/2012 | Geddes et al. |
| 2012/0111491 A1 | 5/2012 | Huang et al. |
| 2012/0118617 A1 | 5/2012 | Bories-Azeau et al. |
| 2012/0126181 A1 | 5/2012 | Whitcomb et al. |
| 2012/0138913 A1 | 6/2012 | Alsayed et al. |
| 2012/0141731 A1 | 6/2012 | Mirkin et al. |
| 2012/0148438 A1 | 6/2012 | Whitcomb |
| 2012/0148443 A1 | 6/2012 | Whitcomb |
| 2012/0148823 A1 | 6/2012 | Chu |
| 2012/0148844 A1 | 6/2012 | Whitcomb |

(56) References Cited

U.S. PATENT DOCUMENTS

| | | |
|---|---|---|
| 2012/0156458 A1 | 6/2012 | Chu |
| 2012/0164469 A1 | 6/2012 | Hsu et al. |
| 2012/0164470 A1 | 6/2012 | Leschkies et al. |
| 2012/0171499 A1 | 7/2012 | Rouse |
| 2012/0175585 A1 | 7/2012 | Banin et al. |
| 2012/0207644 A1 | 8/2012 | Ollmann et al. |
| 2012/0217477 A1 | 8/2012 | So et al. |
| 2012/0247272 A1 | 10/2012 | Whitcomb et al. |
| 2012/0247275 A1 | 10/2012 | Yang et al. |
| 2012/0279870 A1 | 11/2012 | Assmann et al. |
| 2012/0280168 A1 | 11/2012 | Ma et al. |
| 2012/0282186 A1 | 11/2012 | Mirkin et al. |
| 2012/0298170 A1 | 11/2012 | Lee et al. |
| 2012/0298930 A1 | 11/2012 | Zou |
| 2012/0298931 A1 | 11/2012 | Ollmann |
| 2012/0301349 A1 | 11/2012 | Whitcomb |
| 2012/0301737 A1 | 11/2012 | Labelle et al. |
| 2012/0301742 A1 | 11/2012 | Whitcomb |
| 2012/0320492 A1 | 12/2012 | Radivojevic et al. |
| 2012/0329935 A1 | 12/2012 | Matsumura et al. |
| 2013/0004765 A1 | 1/2013 | Zou et al. |
| 2013/0029360 A1 | 1/2013 | Suh et al. |
| 2013/0040525 A1 | 2/2013 | Park et al. |
| 2013/0071326 A1 | 3/2013 | Martinez et al. |
| 2013/0084464 A1 | 4/2013 | See et al. |
| 2013/0130392 A1 | 5/2013 | Thalappil et al. |
| 2013/0181189 A1 | 7/2013 | Bertin |
| 2013/0251943 A1 | 9/2013 | Pei et al. |
| 2013/0255444 A1 | 10/2013 | Kawaguchi et al. |
| 2013/0260282 A1 | 10/2013 | Yan et al. |
| 2013/0272919 A1 | 10/2013 | Kim et al. |
| 2014/0008106 A1 | 1/2014 | Wright et al. |

FOREIGN PATENT DOCUMENTS

| | | |
|---|---|---|
| JP | 2004123924 | 4/2004 |
| JP | 2009205924 | 9/2009 |
| WO | 0100876 | 1/2001 |
| WO | 0151665 | 7/2001 |
| WO | 0173123 | 10/2001 |
| WO | 2005005687 | 1/2005 |
| WO | 2005092286 | 10/2005 |
| WO | 2009083748 | 7/2009 |
| WO | 2009086161 | 7/2009 |
| WO | 2009107694 | 9/2009 |
| WO | 2011101837 | 8/2011 |
| WO | 2012051219 | 4/2012 |
| WO | 2012081904 | 6/2012 |
| WO | 2012083082 | 6/2012 |
| WO | 2012123435 | 9/2012 |
| WO | 2012138651 | 10/2012 |
| WO | 2012138658 | 10/2012 |
| WO | 2012138659 | 10/2012 |
| WO | 2012170456 | 12/2012 |
| WO | 2012171486 | 12/2012 |
| WO | 2012177093 | 12/2012 |
| WO | 2012177223 | 12/2012 |
| WO | 2013003850 | 1/2013 |
| WO | 2013010398 | 1/2013 |
| WO | 2013019020 | 2/2013 |
| WO | 2013022499 | 2/2013 |
| WO | 2013033367 | 3/2013 |

OTHER PUBLICATIONS

Guo, Z. et al. Shape separation of colloidal gold nanoparticles through salt-triggered selective precipitation. Chemical Communications 47, 4180 (2011).
Jana, N. R. Nanorod shape separation using surfactant assisted self-assembly. Chemical Communications 1950 (2003).
Maciejewski et al., Diallyldimethylammonium and trimethylvinylammonium ionic liquids—Synthesis and application to catalysis; Applied Catalysis A (2013), 168-175.
Bryning, M. B., Islam, M. F., Kikkawa, J. M. & Yodh, A. G. Very low conductivity threshold in bulk isotropic single-walled carbon nanotube-epoxy composites. Advanced Materials 17, 1186-1191 (2005).
Garnett, E. C. et al. Self-limited plasmonic welding of silver nanowirejunctions. Nature Materials 11,241-249 (2012).
Ducamp-Sanguesa, C., Herrera-Urbina, R. & Figlarz, M. Synthesis and characterization of fine and monodisperse silver particles of uniform shape. Journal of Solid State Chemistry 100,272-280 (1992).
Sun, Y., Yin, Y., Mayers, B. T., Herricks, T. & Xia, Y. Uniform silver nanowires synthesis by reduc-ing AgNO 3 with ethylene glycol in the presence of seeds and Poly(Vinyl pyrrolidone). Chemistry of Materials 14,4736-4745 (2002).
Wiley, B., Sun, Y., Mayers, B. & Xia, Y. Shape-controlled synthesis of metal nanostructures: The case of silver. Chemistry—A European Journal 11,454-463 (2005).
Skrabalak, S. E., Wiley, B. J., Kim, M., Formo, E. V. & Xia, Y. On the polyol synthesis of silver nanostructures: Glycolaldehyde as a reducing agent. Nano Letters 8, 2077-2081 (2008).
Al-Saidi, W. A., Feng, H. & Fichthorn, K. A. Adsorption of polyvinylpyrrolidone on ag surfaces: Insight into a structure-directing agent. Nano Letters 12, 997-1001 (2012).
Sun, Y., Mayers, B., Herricks, T. & Xia, Y. Polyol synthesis of uniform silver nanowires: a plausible growth mechanism and the supporting evidence. Nano Letters 3, 955-960 (2003).
Gao, Y. et al. Evidence for the monolayer assembly of poly(vinylpyrrolidone) on the surfaces of silver nanowires. The Journal of Physical Chemistry B 108, 12877-12881 (2004).
Wang, H., Qiao, X., Chen, J., Wang, X. & Ding, S. Mechanisms of PVP in the preparation of silver nanoparticles. Materials Chemistry and Physics 94, 449-453 (2005).
Ghorbani-Choghamarani, A., Chenani, Z. & Mallakpour, S. Supported nitric acid on silica gel and polyvinyl pyrrolidone (PVP) as an efficient oxidizing agent for the oxidation of urazoles and bis-urazoles. Synthetic Communications 39, 4264-4270 (2009).
Tsuji, M. et al. Rapid synthesis of silver nanostructures by using microwave-polyol method with the assistance of pt seeds and polyvinylpyrrolidone. Colloids and Surfaces A: Physicochemical and Engineering Aspects 293, 185-194 (2007).
Chen, C. et al. The influence of seeding conditions and shielding gas atmosphere on the synthesis of silver nanowires through the polyol process. Nanotechnology 17, 466-474 (2006).
Wiley, B., Sun, Y. & Xia, Y. Synthesis of silver nanostructures with controlled shapes and properties. Accounts of Chemical Research 40, 1067-1076 (2007).
Giersig, M., Pastoriza-Santos, I. & Liz-Marzn, L. M. Evidence of an aggregative mechanism during the formation of silver nanowires in N,N-dimethylformamideElectronic supplementary information (ESI) available: TEM micrographs showing early (left) and late (right) stages during the formation of Ag nanowires. Journal of Materials Chemistry 14, 607 (2004).
Suber, L., Sondi, I., Matijevi, E. & Goia, D. V. Preparation and the mechanisms of formation of silver particles of different morphologies in homogeneous solutions. Journal of Colloid and In-terface Science 288, 489-495 (2005).
Tang, X. et al. Rapid and high-yield synthesis of silver nanowires using air-assisted polyol method with chloride ions. Colloids and Surfaces A: Physicochemical and Engineering Aspects 338, 33-39 (2009).
Lu, Y. C. & Chou, K. S. Tailoring of silver wires and their performance as transparent conductive coatings. Nanotechnology 21, 215707 (2010).
Chang, S., Chen, K., Hua, Q., Ma, Y. & Huang, W. Evidence for the growth mechanisms of silver nanocubes and nanowires. The Journal of Physical Chemistry C 115, 7979-7986 (2011).
Wiley, B., Sun, Y. & Xia, Y. Polyol synthesis of silver nanostructures: control of product morphology with Fe(II) or Fe (III) species. Langmuir 21, 8077-8080 (2005).
Zhang, W., Chen, P., Gao, Q., Zhang, Y. & Tang, Y. High-concentration preparation of silver nanowires: Restraining in situ nitric acidic etching by steel-assisted polyol method. Chemistry of Materials 20, 1699-1704 (2008).

(56) References Cited

OTHER PUBLICATIONS

Valade, D., Boschet, F., Roualds, S. & Ameduri, B. Preparation of solid alkaline fuel cell binders based on fluorinated poly(diallyldimethylammonium chloride)s [poly(DADMAC)] or poly(chlorotrifluoroethylene-co-DADMAC) copolymers. Journal of Polymer Science Part A: Poly-mer Chemistry 47, 2043-2058 (2009).

Wang, M. C. P., Zhang, X., Majidi, E., Nedelec, K. & Gates, B. D. Electrokinetic assembly of selenium and silver nanowires into macroscopic fibers. ACS Nano 4, 2607-2614 (2010).

Kowalczyk, B., Lagzi, I. & Grzybowski, B. A. Nanoseparations: Strategies for size and/or shape-selective purification of nanoparticles. Current Opinion in Colloid & Interface Science 16, 135-148 (2011).

Sun, Y. and Xia, Y. Large-Scale Synthesis of Uniform Silver Nanowires Through a Soft, Self-seeding, Polyol Process. Advanced Materials (2002) 14, 11, 833-837.

Sun, Y. Gates, B., Mayers, B., Xia, Y. Crystalline Silver Nanowires by Soft Solution Processing. Nano Letters (2002) 2, 2, 165-168.

K. K. Caswell, Christopher M. Bender, Catherine J. Murphy. "Seedless, Surfactantless Wet Chemical Synthesis of Silver Nanowires". Nano Letters 2003 vol. 3, No. 5. 667-669. Published on web Apr. 22, 2003.

Julio M. D'Arcy, Henry D. Tran, Vincent C. Tung, Alexander K. Tucker-Schwartz, Rain P. Wong, Yang Yang, and Richard B. Kaner. "Versatile solution for growing thin films of conducting polymers". PNAS. Available Nov. 1, 2010.

Liangbing Hu, Han Sun Kim, Jung-Yong Lee, Peter Peumans, and Yi Cui. "Scalable Coating and Properties of Transparent, Flexible, Silver Nanowire Electrodes" ACS Nano (2010), 4 (5), pp. 2955-2963.

\* cited by examiner

US 9,410,007 B2

PROCESS FOR MAKING SILVER NANOSTRUCTURES AND COPOLYMER USEFUL IN SUCH PROCESS

CROSS-REFERENCE TO RELATED APPLICATIONS

This application is a U.S. non-provisional application, which claims the benefit of U.S. provisional application No. 61/706,280 filed Sep. 27, 2012, the entirety of which is hereby incorporated by reference.

FIELD OF THE INVENTION

The present invention relates to a process for making silver nanostructures and a copolymer useful in such process.

BACKGROUND

Transparent conductors, such as Indium Tin Oxide (ITO), combine the electrical conductivity of metal with the optical transparency of glass and are useful as components in electronic devices, such as in display devices. Flexibility is likely to become a broader challenge for ITO, which does not seem well suited to the next generation of display, lighting, or photovoltaic devices. These concerns have motivated a search for replacements using conventional materials and nanomaterials. There is variety of technical approaches for developing ITO substitutes and there are four areas in which the alternative compete: price, electrical conductivity, optical transparency, and physical resiliency.

Electrically conductive polymers, such as polythiophene polymers, particularly a polymer blend of poly(3,4-ethylenedioxythiophene) and poly(styrene sulfonate) ("PEDOT-PSS") have been investigated as possible alternatives to ITO. The electrical conductivity of electrically conductive polymers is typically lower than that of ITO, but can be enhanced through the use of conductive fillers and dopants.

Processes for making electrically conductive metal nanostructures are known. Ducamp-Sanguesa, et. al., *Synthesis and Characterization of Fine and Monodisperse Silver Particles of Uniform Shape*, Journal of Solid State Chemistry 100, 272-280 (1992) and U.S. Pat. No. 7,585,349, issued Sep. 8, 2009, to Younan Xia, et. al., each describe synthesis of silver nanowires by reduction of a silver compound in a glycol in the presence of polyvinylpyrrolidone.

Structures comprising a network of silver nanowires encapsulated in an electrically conductive polymer have been described. U.S. Patent Application Publication No. 2008/0259262 describes forming such structures by depositing a network of metal nanowires on a substrate and then forming a conductive polymeric film in situ, e.g., by electrochemical polymerization using the metal nanowire network as an electrode. U.S. Patent Application Publication No. 2009/0129004 describes forming such structures by filtration of a silver nanowire dispersion to form a silver nanowire network, heat treating the network, transfer printing the heat treated network, and encapsulating the transfer printed network with polymer.

The performance of such electrically conductive polymer/silver nanowire composite films is, in some cases, comparable to that of ITO but the processing required to obtain composite films that exhibit that level of performance is quite demanding, for example, the above described films require processing steps, such as thermal treatment and compression, in order to ensure that sufficient electrical connections are made among the electrically conductive nanowires of the composite film to provide a film having high conductivity and transparency. There is an ongoing unresolved interest in increasing the electrical conductivity and optical transparency of electrically conductive polymer films.

SUMMARY OF THE INVENTION

In a first aspect, the present invention is directed to a process for making silver nanostructures, comprising reacting at least one polyol and at least one silver compound that is capable of producing silver metal when reduced, in the presence of:
(a) a source of chloride or bromide ions, and
(b) at least one copolymer that comprises:
  (i) one or more first constitutional repeating units that each independently comprise at least one pendant saturated or unsaturated, five-, six-, or seven-membered, acylamino- or diacylamino-containing heterocylic ring moiety per constitutional repeating unit, and
  (ii) one or more second constitutional repeating units, each of which independently differs from the one or more first nonionic constitutional repeating units,
  and has a molecular weight of greater than or equal to about 500 grams per mole.

In a second aspect, the present invention is directed to a copolymer, comprising, based on 1000 constitutional repeating units of the copolymer:
  from 800 to 999 first constitutional repeating units, each independently comprising at least one pendant saturated or unsaturated, five-, six-, or seven-membered, acylamino- or diacylamino-containing heterocylic ring moiety per constitutional repeating unit, and
  from 1 to 200 second constitutional repeating units, each independently comprising at least one pendant organic moiety that: (i) is selected from ionic organic moieties and nonionic organic moieties, and (ii) is not a saturated or unsaturated, five-, six-, or seven-membered, acylamino- or diacylamino-containing heterocylic ring moiety, and having a molecular weight of greater than or equal to about 500 grams per mole.

In a third aspect, the present invention is directed to a process for making silver nanostructures, comprising reacting at least one polyol and at least one silver compound that is capable of producing silver metal when reduced, in the presence of:
(a) a source of chloride or bromide ions, and
(b) at least one copolymer that comprises:
  (i) one or more first constitutional repeating units that each independently comprise at least one pendant saturated or unsaturated, five-, six-, or seven-membered, acylamino- or diacylamino-containing heterocylic ring moiety per constitutional repeating unit, and
  (ii) one or more second constitutional repeating units, each of which independently differs from the one or more first nonionic constitutional repeating units,
  and has a molecular weight of greater than or equal to about 500 grams per mole; and
(c) at least one base.

DETAILED DESCRIPTION OF THE INVENTION

Figure 1A:
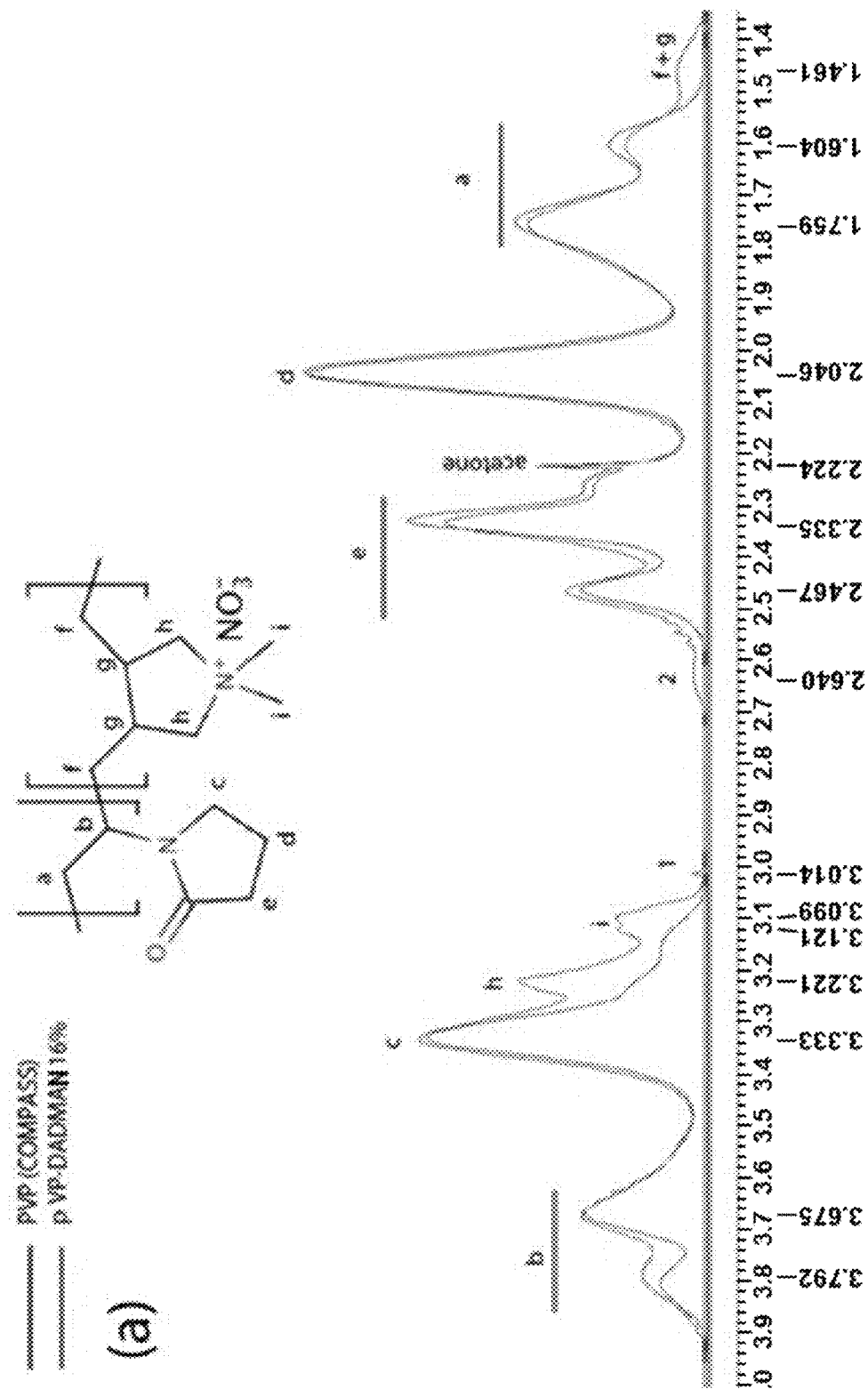
FIGS. 1(a) and 1(b) show representative 1H NMR and FTIR spectra of the poly(vinylpyrrolidone-co-diallyldimethylammonium nitrate) random copolymers ("poly(VP-co-DADMAN)" copolymers) of Examples 1A-1E.

As used herein, the following terms have the following meanings:

"doped" as used herein in reference to an electrically conductive polymer means that the electrically conductive polymer has been combined with a polymeric counterion for the electrically conductive polymer, which polymeric counterion is referred to herein as "dopant", and is typically a polymeric acid, which is referred to herein as a "polymeric acid dopant", "doped electrically conductive polymer" means a polymer blend comprising an electrically conductive polymer and a polymeric counterion for the electrically conductive polymer, "electrically conductive polymer" means any polymer or polymer blend that is inherently or intrinsically, without the addition of electrically conductive fillers such as carbon black or conductive metal particles, capable of electrical conductivity, more typically to any polymer or oligomer that exhibits a bulk specific conductance of greater than or equal to $10^{-7}$ Siemens per centimeter ("S/cm"), unless otherwise indicated, a reference herein to an "electrically conductive polymer" include any optional polymeric acid dopant, "electrically conductive" includes conductive and semiconductive, "electronic device" means a device that comprises one or more layers comprising one or more semiconductor materials and makes use of the controlled motion of electrons through the one or more layers, "layer" as used herein in reference to an electronic device, means a coating covering a desired area of the device, wherein the area is not limited by size, that is, the area covered by the layer can, for example, be as large as an entire device, be as large as a specific functional area of the device, such as the actual visual display, or be as small as a single sub-pixel.

As used herein, the following terms have the following meanings:

"alkyl" means a monovalent straight, branched or cyclic saturated hydrocarbon radical, more typically, a monovalent straight or branched saturated ($C_1$-$C_{40}$)hydrocarbon radical, such as, for example, methyl, ethyl, n-propyl, isopropyl, n-butyl, isobutyl, tert-butyl, hexyl, octyl, hexadecyl, octadecyl, eicosyl, behenyl, tricontyl, and tetracontyl, "cycloalkyl" means a saturated hydrocarbon radical, more typically a saturated ($C_5$-$C_{22}$) hydrocarbon radical, that includes one or more cyclic alkyl rings, which may optionally be substituted on one or more carbon atoms of the ring with one or two ($C_1$-$C_6$)alkyl groups per carbon atom, such as, for example, cyclopentyl, cycloheptyl, cyclooctyl, "heteroalkyl" means an alkyl group wherein one or more of the carbon atoms within the alkyl group has been replaced by a hetero atom, such as nitrogen, oxygen, or sulfur, "heterocyclic" means an cyclic hydrocarbon group in which one or more of the ring carbon atoms has been replaced by a hetero atom, such as nitrogen, oxygen, or sulfur, "alkylene" refers to a divalent alkyl group including, for example, methylene, and poly(methylene), "alkenyl" means an unsaturated straight or branched hydrocarbon radical, more typically an unsaturated straight, branched, ($C_2$-$C_{22}$) hydrocarbon radical, that contains one or more carbon-carbon double bonds, including, for example, ethenyl, n-propenyl, and iso-propenyl, "aryl" means an unsaturated hydrocarbon radical that contains one or more six-membered carbon rings in which the unsaturation may be represented by three conjugated carbon-carbon double bonds, wherein one or more of the ring carbons may be substituted with one or more hydroxy, alkyl, alkenyl, alkoxy, halo, or alkylhalo substituents, such as, for example, phenyl, methylphenyl, trimethylphenyl, nonylphenyl, chlorophenyl, trichloromethylphenyl, naphthyl, and anthryl, and "aralkyl" means an alkyl group substituted with one or more aryl groups, more typically a ($C_1$-$C_{18}$)alkyl substituted with one or more ($C_6$-$C_{14}$)aryl substituents, such as, for example, phenylmethyl, phenylethyl, and triphenylmethyl, and "($C_x$-$C_y$)" in reference to an organic group, wherein x and y are each integers, means that the group may contain from x carbon atoms to y carbon atoms per group.

Addition of the prefix "(meth)" to a group name, such as "acrylate", "acrylic", "acrylamide", "acrylamido", or "allyl" to form terms such as "(meth)acrylate", "(meth)acrylic", "(meth)acrylamide, "(meth)acrylamido", and "(meth)allyl" is used herein to indicate the methyl-substituted and/or the non-methyl-substituted homologs of such groups. For example, the term "ethyl (meth)acrylate", as used herein means ethyl acrylate, ethyl methacrylate, or a mixture thereof.

As used herein in reference to an organic or inorganic moiety, the following terms have the following meanings:

"cationic" means that the moiety carries a net positive electrical charge,

"anionic" means that the moiety carries a net negative electrical charge,

"amphoteric" and "zwitterionic" mean that the moiety has no net electrical charge, but carries, or under certain pH conditions, may carry both a localized negative electrical charge and a localized positive electrical charge, and "nonionic" means that the moiety is carries no net electrical charge no localized negative electrical charge and no localized positive electrical charge.

As used herein in reference to a polymer or copolymer molecule, the following terms have the following meanings:

"constitutional repeating unit" means the smallest constitutional unit, the repetition of which constitutes a chain or a block of the polymer or copolymer molecule, "constitutional unit" means an atom or group of atoms, including pendant atoms or groups, if any, comprising a part of the essential structure of the polymer or copolymer molecule or of a block or chain of the polymer or copolymer molecule, "chain" means the whole or a portion of the polymer or copolymer molecule, comprising a linear or branched sequence of one or more constitutional units between two boundary constitutional units, each of which may be either an end-group, a branch point or an otherwise-designated characteristic feature of the polymer or copolymer molecule, and "block" means, in reference to a copolymer, a portion of the copolymer, comprising two or more constitutional units that has at least one feature which is not present in the adjacent portions of the copolymer.

The dimensions referred to herein in regard to bulk nanostructure materials are averaged dimensions obtained by sampling individual nanostructures contained in the bulk material wherein the lengths are obtained using optical microscopy, and the diameters are determined using electron microscopy. Using this process, a sample of about 150 nanostructures are measured to determine the lengths, and a sample of about 10 nanostructures are measured to determine the diameters. An average diameter, average length, and average aspect ratio are then determined for the nanostructures examined as follows. Unless otherwise indicated, nanostructure dimensions are given as arithmetic averages of the measured nanowire population. In the case of anisotropic nanostructures, such as nanowires, lengths may also be given as length weighted average lengths, as determined by first taking the length of each nanowire and dividing it by the sum of the lengths of all nanowires measured to derive a quantity $W_1$, which is the percent contribution of the single nanowire to the sum length of all nanowires, then, for each of the measured nanowires, deriving a weighted length by multiplying the length of the nanowire by its respective $W_1$ value, and finally taking the arithmetic average of the weighted lengths of the measured nanowires to derive the length weighted average length of the nanowire population. Aspect ratios of anisotropic nanostructures are determined by dividing the length weighted average length of the nanowire population by the average diameter of the anisotropic nanostructure population.

As used herein, the term "nanostructures" generally refers to nano-sized structures, at least one dimension of which is less than or equal to 2000 nm, more typically less than or equal to 500 nm, even more typically, less than or equal to 250 nm, or less than or equal to 100 nm, or less than or equal to 50 nm, or less than or equal to 25 nm. The anisotropic electrically conductive nanostructures can be of any anisotropic shape or geometry. As used herein, the terminology "aspect ratio" in reference to a structure means the ratio of the structure's longest characteristic dimension to the structure's next longest characteristic dimension. In one embodiment, the anisotropic electrically conductive nanostructures have an elongated shape with a longest characteristic dimension, i.e., a length, and a next longest characteristic dimension, i.e., a width or diameter, with an aspect ratio of greater than 1.

The at least one polyol serves as liquid medium in which to conduct the reaction and as a reducing agent that reduces the silver compound to silver metal. Suitable polyols are organic compounds having a core moiety comprising at least 2 carbon atoms, which may optionally further comprise one or more heteroatoms selected from N and O, wherein the core moiety is substituted with at least 2 hydroxyl groups per molecule and each hydroxyl group is attached to a different carbon atom of the core moiety. Suitable polyols are known and include, for example, alkylene glycols, such as ethylene glycol, propylene glycols, and butanediols, alkylene oxide oligomers, such as diethylene glycol, triethylene glycol, tetraethylene glycol, dipropylene glycol, and polyalkylene glycols, such as polyethylene glycol and polypropylene glycol, provided that such polyalkylene glycol is liquid at the reaction temperature, triols, such as, for example, glycerol, trimethylolpropane, triethanolamine, and trihydroxymethylaminomethane, and compounds having more than 3 hydroxyl groups per molecule, as well as mixtures of two or more of any of such compounds. In one embodiment, the polyol comprises ethylene glycol.

Suitable silver compounds that are capable of producing silver metal when reduced are known and include silver oxide, silver hydroxide, organic silver salts, and inorganic silver salts, such as silver nitrate, silver nitrite, silver sulfate, silver halides such as silver chloride, silver carbonates, silver phosphate, silver tetrafluoroborate, silver sulfonate, silver carboxylates, such as, for example, silver formate, silver acetate, silver propionate, silver butanoate, silver trifluoroacetate, silver acetacetonate, silver lactate, silver citrate, silver glycolate, silver tosylate, silver tris(dimethylpyrazole)borate, as well as mixtures of two or more of such compounds. In one embodiment, the silver compound capable of producing silver metal when reduced comprises silver nitrate ($AgNO_3$).

Suitable sources of chloride and/or bromide ions include hydrochloric acid, chloride salts, such as ammonium chloride, calcium chloride, ferric chloride, lithium chloride, potassium chloride, sodium chloride, triethylbenzyl ammonium chloride, tetrabutyl ammonium chloride, hydrobromic acid, and bromide salts, such as ammonium bromide, calcium bromide, ferric bromide, lithium bromide, potassium bromide, sodium bromide, triethylbenzyl ammonium bromide, tetrabutyl ammonium bromide, or, in a case wherein the copolymer comprises a chloride or bromide counterion, the chloride or bromide counterion of the copolymer. In one embodiment, the source of chloride ions comprises lithium chloride.

In one embodiment, the source of chloride or bromide ions comprises silver chloride and/or silver bromide, which may be added to the reaction mixture in the form of colloidal particles. The colloidal particles of silver chloride and/or silver bromide may have a particle size of from about 10 nm to about 10 μm, more typically of from about 50 nm to about 10 μm.

The pH of the at least one polyol may be any pH at room temperature (25° C.). The pH of the at least one polyol may be determined by conventional analytical methods known in the art, including, for example, colorimetric titration, potentiometric titration, direct measurement using a pH meter, and the like. Typically, the pH of the at least one polyol is from about 1 to about 14. More typically, the pH of the at least one polyol is from about 5 to about 12. Even more typically, the pH of the at least one polyol is from about 7 to about 10.

The at least one base is any compound that increases the pH of the reaction mixture in which the at least one base is dissolved, dispersed, or suspended. Suitable bases include alkali metal hydroxides, such as, for example, sodium hydroxide, lithium hydroxide, potassium hydroxide, rubidium hydroxide, cesium hydroxide, and mixtures thereof. In an embodiment, the at least one base comprises sodium hydroxide, lithium hydroxide, potassium hydroxide, or mixtures thereof.

The amount of the at least one base is typically from about $5.39 \times 10^{-5}$ to about $3.47 \times 10^{-4}$ pbw of the at least one base per 1 pbw of the total amount of the at least one polyol used in the reaction. More typically, the amount of the at least one base is typically from about $5.39 \times 10^{-5}$ to about $1.30 \times 10^{-4}$ pbw of the at least one base per 1 pbw of the total amount of the at least one polyol used in the reaction.

The total amount of silver compound added to the reaction mixture over the entire course of the reaction, based on one liter of reaction mixture, is typically from about $1.5 \times 10^{-3}$ mole to about 1 mole of the silver compound (corresponding, in the case of $AgNO_3$ as the silver compound and ethylene glycol as the polyol, to about 0.026 wt % to about 17 wt % $AgNO_3$ in ethylene glycol), more typically from greater than or equal to $3 \times 10^{-2}$ mole to about 1 mole of the silver compound (corresponding, in the case of $AgNO_3$ as the silver compound and ethylene glycol as the polyol, to about 0.51 wt % to about 17 wt % $AgNO_3$ in ethylene glycol). The silver compound may be introduced to the reaction mixture as a solid powder, the total amount of which may be introduced at one time or which may introduced in a series of portion of the total amount. Alternatively, the silver compound may be fed to the reaction mixture as a dilute solution of the silver compound in the polyol comprising from about 10 g to about 100 g of the silver compound per 1000 g polyol at a rate that is sufficiently slow as to avoid reducing the temperature of the reaction mixture.

In one embodiment, the total amount of silver compound added to the reaction mixture is, based on one Liter of reaction mixture, typically from about 0.02 moles to about 0.22 moles (corresponding, in the case of $AgNO_3$ as the silver compound and ethylene glycol as the polyol, to from about 0.3 wt % to about 3.75 wt % $AgNO_3$ in ethylene glycol), more typically from about 0.06 moles to about 0.18 moles (corresponding, in the case of $AgNO_3$ as the silver compound and ethylene glycol as the polyol, to from about 1 wt % to 3 wt % $AgNO_3$ in ethylene glycol), even more typically from about 0.07 moles to about 0.18 moles (corresponding, in the case of $AgNO_3$ as the silver compound and ethylene glycol as the polyol, to from about 1.25 wt % to about 3 wt % $AgNO_3$ in ethylene glycol). In one embodiment, the total amount of silver compound added to the reaction mixture is, based on one Liter of reaction mixture, from greater than 0.1 moles to about 0.22 moles (corresponding, in the case of $AgNO_3$ as the silver compound and ethylene glycol as the polyol, to from about 1.7 wt % to about 3.75 wt % $AgNO_3$ in ethylene glycol).

In one embodiment, the nanostructures are made in the presence of from about $5.4 \times 10^{-5}$ moles to about $5.4 \times 10^{-3}$ moles of particles of silver chloride and/or particles of silver bromide per Liter of reaction mixture. While not wishing to be bound by theory, it is believed that the particles of silver chloride and/or particles of silver bromide catalyze growth of the silver nanostructures, but do not participate as a reactive "seeds" that become incorporated within the silver nanostructures.

In one embodiment, the at least one polyol and at least one silver compound are reacted at a temperature of from about 100° C. to about 210° C., more typically from about 130 to about 185° C.

In one embodiment, at least a portion of the polyol is preheated to a temperature of from about 100° C. to about 210° C., more typically from about 130° C. to about 185° C., typically for a period of greater than about 1 minute, more typically for a period of greater than about 5 minutes prior to introduction of the source of chloride or bromide ions, and/or the silver compound.

In one embodiment, particles of silver chloride or silver bromide are formed in the polyol in a preliminary step, wherein a silver compound and polyol are reacted in the presence of a source of chloride or bromide ions, typically in with the silver compound in an excess of from greater than 1, more typically from about 1.01 to about 1.2 moles, of silver compound per mole chloride or bromide ions. In one embodiment, from about $5.4 \times 10^{-5}$ to about $5.4 \times 10^{-4}$ moles silver compound per liter of reaction mixture are reacted in the presence of from about $5.4 \times 10^{-5}$ to about $5.4 \times 10^{-4}$ moles of the source of chloride and/or bromide ions per liter of reaction mixture to form silver chloride and/or silver bromide seed particles in the reaction mixture. In one embodiment particles of silver chloride or silver bromide are formed at a temperature of from about 100° C. to about 210° C., more typically from about 130° C. to about 185° C. The formation of the silver chloride or silver bromide particles is typically conducted over a time period of greater than or equal to about 1 minute, more typically of from about 1 minute to about 10 minutes.

In one embodiment from about $1.5 \times 10^{-3}$ to about 1 mole of the silver compound per Liter of reaction mixture are added in a second reaction step. The growth step is conducted at a temperature of about 100° C. to about 210° C., more typically from about 130° C. to about 185° C. The second reaction step of the reaction is typically conducted over a time period of greater than or equal to about 5 minutes, more typically from about 5 minutes to about 4 hours, and even more typically from about 10 minutes to 1 about hour.

In one embodiment, particles of silver chloride or silver bromide are formed in the polyol simultaneously with the formation of the silver nanostructures in a single step, wherein a silver compound and polyol are reacted in the presence of a source of chloride or bromide ions, typically in with the silver compound in very large molar excess. The single step formation reaction is conducted at a temperature of from about 100° C. to about 210° C., more typically from about 130° C. to about 185° C. The single step formation reaction is typically conducted over a time period of greater than or equal to about 5 minutes, more typically from about 5 minutes to about 4 hours, and even more typically from about 10 minutes to about 1 hour.

The reaction may be conducted under an air atmosphere or under an inert atmosphere, such as a nitrogen or argon atmosphere. In one embodiment, the reaction is conducted under a nitrogen atmosphere.

The copolymer is believed to function as an organic protective agent. The amount of copolymer is typically from about 0.1 to about 20 parts by weight ("pbw"), more typically from about 1 to about 5 pbw, of the copolymer per 1 pbw of silver compound, based on the total amount of the silver compound added to the reaction mixture.

In one embodiment, the reaction is conducted in the presence of, based on the weight of the reaction mixture, from about 0.01 wt % to about 50 wt %, more typically from about 0.1 wt % to about 20 wt %, and even more typically from about 0.5 wt % to 8 wt %, of the copolymer.

In one embodiment, the at least one silver compound comprises silver nitrate, the at least one polyol comprises ethylene glycol, the total amount of silver nitrate added to the reaction mixture is from $1.5 \times 10^{-3}$ mole to about 1 mole silver nitrate per Liter of reaction mixture, and the reaction is conducted in the presence of, based on the weight of the reaction mixture, from about 0.01 wt % to about 50 wt %, more typically from about 0.1 wt % to about 20 wt %, and even more typically from about 0.5 wt % to 8 wt %, of the copolymer.

Saturated or unsaturated five-, six-, or seven-membered acylamino- or diacylamino-containing heterocylic ring moieties suitable as the at least one pendant group of the first constitutional repeating unit of the copolymer include, for example, pyrrolidonyl, pyrrolidinedionyl, azacyclohexanoyl, azacyclohexadionyl, azacycloheptanonyl, and azacycloheptadionyl.

In one embodiment, the first constitutional repeating units of the copolymer each independently comprise a pyrrolidonyl moiety or a pyrrolidinedionyl moiety. In one embodiment, each of the first constitutive units of the copolymer comprises a pyrrolidonyl moiety.

In one embodiment, the first constitutional repeating units each independently comprise a pendant group according to structure (I):

$$R^1—R^2— \qquad (I)$$

wherein:
  $R^1$ is a saturated or unsaturated five-, six-, or seven-membered acylamino- or diacylamino-containing heterocylic ring moiety, more typically pyrrolidonyl, 2,5 pyrrolidinedionyl, azacyclohexanonyl, azacyclohexadionyl azacycloheptanonyl, azacycloheptadionyl, even more typically pyrrolidonyl or 2,5 pyrrolidinedionyl, and
  $R^2$ is divalent linking group, more typically a divalent linking group selected from poly(alkyleneoxy), —O—C(O)—, —NH—C(O)— and —(CH$_2$)$_n$—, wherein n is an integer of from 1 to 10, more typically of from 1 to 3, or is absent.

The first constitutional repeating units may be made by known synthetic techniques, such as, for example, by grafting of one or more five-, six-, or seven-membered saturated or unsaturated acylamino- or diacylamino-containing heterocylic ring moieties onto a polymer backbone, such as a hydrocarbon polymer backbone, a polyester polymer backbone, or a polysaccharide polymer backbone, or by copolymerization of a nonionic monomer, as described below, with, for example, an ionic monomer, as described below.

In one embodiment, the first constitutional repeating units of the copolymer of the present invention are derived from a first monomer comprising at least one reactive functional group and at least one five-, six-, or seven-membered saturated or unsaturated acylamino- or diacylamino-containing heterocyclic ring moiety per molecule of the monomer.

Suitable reactive functional groups include, for example, hydroxyl groups, isocyanate groups, epoxide groups, amino groups, carboxylate groups, and α,β-unsaturated groups, such as —CH$_2$=CH$_2$, or —H(CH$_3$)C=CH$_2$.

In one embodiment, the first monomer comprises one or more compounds according to structure (II):

$$R^1—R^2—R^3 \qquad (II)$$

wherein:
  $R^1$ and $R^2$ are as described above, and
  $R^3$ is a reactive functional group, more typically a reactive group selected from —CH$_2$=CH$_2$, and —H(CH$_3$)C=CH$_2$.

In one embodiment, the first constitutional repeating units of the copolymer of the present invention are derived from a first monomer selected from vinyl pyrrolidone, vinyl caprolactam, and mixtures thereof. More typically, each of the first constitutional repeating units of the copolymer of the present invention is derived from vinylpyrrolidone.

Constitutional repeating units suitable as the second constitutional repeating units of the copolymer of the present invention may be any constitutional repeating units that differ in composition from the first constitutional repeating units.

In one embodiment, the second constitutional repeating units each comprise at least one pendant moiety per second constitutional repeating unit that: (i) is selected from ionic organic moieties and nonionic organic moieties, and (ii) is not a saturated or unsaturated, five-, six-, or seven-membered, acylamino- or diacylamino-containing heterocylic ring moiety.

In one embodiment, the second constitutional repeating units each comprise at least one pendant moiety per second constitutional repeating unit that is selected from ionic organic moieties. Suitable ionic organic moieties include cationic moieties, anionic moieties, and amphoteric/zwitterionic moieties.

In one embodiment, one or more of the second constitutional repeating units comprise at least one pendant cationic moiety.

Suitable cationic moieties include nitrogenous organic moieties that comprise a primary, secondary, or tertiary amino nitrogen atom, or a quaternary nitrogen atom. In those embodiments comprising a quaternary nitrogen atom, the, the cationic moiety is typically in the form of a salt that is associated with a counter anion, which may be selected from organic anions, such as sulphonate anions, and inorganic anions, such as halogen anions or nitrate anions. In one embodiment, one or more of the second constitutional repeating units each comprise at least one pendant cationic moiety that comprises a quaternary ammonium nitrogen atom and counter anion, more typically a chloride, bromide, or nitrate counter anion, or a mixture thereof.

In one embodiment, one or more of the second constitutional repeating units each independently comprise, per second constitutional repeating unit, selected from:
  acyclic groups that comprise at least one primary, secondary, or tertiary amino nitrogen atom or quaternary nitrogen atom per group, and
  five or six-membered heterocylic ring-containing groups that comprise at least one nitrogen atom, which may be a quaternary nitrogen atom, as a ring member.

Five or six-membered heterocyclic ring-containing groups suitable as the at least one nitrogenous cationic group of the second constitutive unit, include, for example, pyrrolidinyl, pyrrolinyl, imidazolidinyl, pyrrolyl, imidazolyl, pyrazolidinyl, pyrazolinyl, piperidinyl, piperazinyl, pyridinyl, pyrazinyl, pyrimadinyl, or pyridazinyl groups, more typically quaternized pyrrolidinyl, quaternized pyrrolinyl, quaternized imidazolidinyl, quaternized pyrrolyl, quaternized imidazolyl, quaternized pyrazolidinyl, quaternized pyrazolinyl, quaternized piperidinyl, quaternized piperazinyl, quaternized pyridinyl, quaternized pyrazinyl, quaternized pyrimadinyl, or quaternized pyridazinyl groups.

In one embodiment, one or more of the second constitutional repeating units comprise at least one pendant anionic organic moiety. Suitable anionic moieties include, for example, carboxylate, sulphonate, sulfate, phosphate, and phosphonate moieties, such as, for example, alkyl carboxylate moieties, alkyl sulphonate moieties, alkaryl sulphonate moieties, and alkyl sulfate moieties, and salts thereof. In some embodiments, the anionic moiety is in the form of a salt that is associated with a counter cation, which may be an inorganic cation or an organic cation, such as an ammonium cation, a cation comprising a primary, secondary, or tertiary amino nitrogen, a cation comprising a quaternary nitrogen atom, an alkali metal cation, or a mixture thereof.

In one embodiment, one or more of the second constitutional repeating units comprise at least one pendant amphoteric/zwitterionic organic moiety. Suitable amphoteric/zwitterionic organic moieties include, for example, moieties that comprise both a cationic group, such as a quaternary nitrogen atom, and anionic group, such as a sulphonate group or a carboxylate group, each of which may independently be in the form of a salt associated with an oppositely charged counterion, as part of the same moiety, such as, for example, sulfobetaine moieties or carboxybetaine moieties.

In one embodiment, one or more of the second constitutional repeating units each independently comprise at least one pendant nonionic organic moiety. Suitable nonionic moieties include hydrocarbyl moieties, such as alkyl, cycloalkyl, aryl, alkaryl, and aralkyl moieties, hydroxyalkyl moieties, and poly(alkylene oxide) moieties.

In one embodiment, the ionic moiety of the ionic constitutional repeating units each independently comprise an acyclic group that comprises at least one quaternized nitrogen atom, such as a moiety according to formula (III):

$$R^{20}—R^{21}— \quad\quad\quad\quad (III)$$

wherein:
R$^{20}$ is an ionic organic moiety or a nonionic organic moiety that is not a saturated or unsaturated, five-, six-, or seven-membered, acylamino- or diacylamino-containing heterocylic ring moiety, and
R$^{21}$ is divalent linking group, more typically a divalent linking group selected from poly(alkyleneoxy), —O—C(O)—, —NH—C(O)— and —(CH$^2$)$_m$—, wherein m is an integer of from 1 to 10, more typically of from 1 to 3, or is absent.

In one embodiment, the copolymer comprises one or more second constitutional repeating units that comprise at least one cationic moiety per such unit. In one embodiment, the copolymer comprises one or more second constitutional repeating units that each independently comprise at least one anionic moiety per such unit. In one embodiment, the copolymer comprises one or more second constitutional repeating units that each independently comprise at least one amphoteric/zwitterionic moiety per such unit. In one embodiment, the copolymer comprises one or more second constitutional repeating units that each independently comprise at least one nonionic moiety per such unit. In one embodiment, the copolymer comprises one or more second constitutional repeating units that each independently comprise at least one cationic moiety per such unit and one or more second constitutional repeating units that each independently comprise at least one anionic moiety per such unit. In one embodiment, the copolymer comprises one or more second constitutional repeating units that each independently comprise at least one cationic moiety per such unit and one or more second constitutional repeating units that each independently comprise at least one amphoteric/zwitterionic moiety per such unit. In one embodiment, the copolymer comprises one or more second constitutional repeating units that each independently comprise at least one cationic moiety per such unit and one or more second constitutional repeating units that each independently comprise at least one nonionic moiety per such unit. In one embodiment, the copolymer comprises one or more second constitutional repeating units that each independently comprise at least one anionic moiety per such unit and one or more second constitutional repeating units that each independently comprise at least one amphoteric/zwitterionic moiety per such unit. In one embodiment, the copolymer comprises one or more second constitutional repeating units that each independently comprise at least one anionic moiety per such unit and one or more second constitutional repeating units that each independently comprise at least one nonionic moiety per such unit. In one embodiment, the copolymer comprises one or more second constitutional repeating units that each independently comprise at least one amphoteric/zwitterionic moiety per such unit and one or more second constitutional repeating units that each independently comprise at least one nonionic moiety per such unit.

The second constitutional repeating units may be made by known synthetic techniques, such as, for example, by grafting of ionic or nonionic organic moieties onto a polymer backbone, such as a hydrocarbon polymer backbone, a polyester polymer backbone, or a polysaccharide polymer backbone, or by copolymerization of a second monomer, as described below, with, for example, the above-described first monomer.

In one embodiment, the second constitutional repeating units of the copolymer of the present invention are derived from a second monomer that is copolymerizable with the first monomer and comprises, per molecule of the monomer, at least one reactive functional group and at least one nitrogenous cationic group selected from:
acyclic groups that comprise at least one primary, secondary, or tertiary amino nitrogen atom or quaternary nitrogen atom per group, and
five or six-membered heterocylic ring-containing groups that comprise at least one nitrogen atom, which may be a quaternary nitrogen atom, as a ring member, such as, for example, pyrrolidinyl, pyrrolinyl, imidazolidinyl, pyrrolyl, imidazolyl, pyrazolidinyl, pyrazolinyl, piperidinyl, piperazinyl, pyridinyl, pyrazinyl, pyrimadinyl, or pyridazinyl moiety.

In one embodiment, the acyclic groups that comprise at least one primary, secondary, or tertiary amino nitrogen atom or quaternary nitrogen atom per group is a an acyclic moiety that is cyclizable, either simultaneously with or subsequent to copolymerization with the first monomer, to form a five or six-membered heterocylic ring that comprises at least one nitrogen atom, which may be a quaternary nitrogen atom, as a ring member.

In one embodiment, the second constitutional repeating units of the copolymer of the present invention are derived from a second monomer comprising, per molecule of the monomer, at least one reactive functional group and at least one group that is (i) selected from ionic organic moieties and nonionic organic moieties, and (ii) is not a saturated or unsaturated, five-, six-, or seven-membered, acylamino- or diacylamino-containing heterocylic ring moiety.

Suitable reactive functional groups are those described above in regard to the first monomer.

In one embodiment, the first monomer comprises one or more compounds according to structure (IV):

$$R^{20}—R^{21}—R^{22} \quad\quad\quad\quad (IV)$$

wherein:
R$^{20}$ and R$^{21}$ are each as described above, and
R$^{22}$ is a reactive functional group, more typically a reactive group selected from —CH$_2$=CH$_2$, and —H(CH$_3$)C=CH$_2$.

Suitable cationic monomers include, for example, dimethylaminomethyl (meth)acrylate, dimethylaminopropyl (meth)acrylate, di(t-butyl)aminoethyl (meth)acrylate, dimethylaminomethyl (meth)acrylamide, dimethylaminoethyl (meth)acrylamide, dimethylaminopropyl (meth)acrylamide, vinylamine, vinyl imidazole, vinylpyridine, vinylpyrrolidine, vinylpyrroline, vinylpyrazolidine, vinylpyrazoline, vinylpiperidine, vinylpiperazine, vinylpyridine, vinylpyrazine, vinylpyrimadine, vinylpyridazine, trimethylammonium ethyl (meth)acrylate salts, dimethylammonium ethyl (meth)acrylate salts, dimethylbenzylammonium (meth)acrylate salts, benzoylbenzyl dimethylammonium ethyl(meth)acrylate salts, trimethyl ammonium ethyl (meth)acrylamido salts, trimethyl ammonium propyl (meth)acrylamido salts, vinylbenzyl trimethyl ammonium salts, diallyldimethyl ammonium salts.

In one embodiment, the second constitutional repeating units of the copolymer of the present invention are derived from a cationic monomer selected from diallyldimethylammonium salts, such as diallyldimethylammonium nitrate, quaternized dimethylaminoethyl(meth)acrylate salts, such as quaternized dimethylaminoethyl(meth)acrylate nitrate, and quaternized vinylimidazole salts, such as quaternized vinylimidazole nitrate.

Suitable anionic monomers include, for example, acrylic acid, acrylic acid, methacrylic acid, vinyl sulphonic acid, vinylbenzene sulphonic acid, (meth)acrylamidomethylpropane sulphonic acid, 2-sulphoethyl methacrylate, and styrenesulfonate, as well as mixtures of and salts thereof.

Suitable amphoteric/zwitterionic monomers include, for example, sulfobetaine (meth)acrylates, sulfobetaine (meth)acrylamides, sulfobetaine (meth)allyl compounds, sulfobetaine vinyl compounds, carboxybetaine (meth)acrylates, carboxybetaine (meth)acrylamides, caboxybetaine (meth)allyl compounds and carboxybetaine vinyl compounds, such as for example, N-(3-sulfopropyl)-N-(methacryloxyethyl)-N,N-dimethyl ammonium betaine, N-(3-acrylamidopropyl)-N,N-dimethylammonioacetate, or N-(3-acryloamidopropyl)-N,N-dimethyl-N-(carboxymethyl)ammonium bromide.

Suitable nonionic monomers include, for example, (meth)acrylamide, esters of an monoethylenically unsaturated monocarboxylic acids, such as methyl (meth)acrylate, ethyl (meth)acrylate, n-propyl (meth)acrylate, n-butyl(meth)acrylate, 2-ethyl-hexyl (meth)acrylate, or hydroxyalkyl esters such as 2-hydroxyethyl (meth)acrylate, polyethylene and/or polypropylene oxide (meth)acrylates (i.e. polyethoxylated and/or polypropoxylated (meth)acrylic acid), vinyl alcohol, vinyl acetate, vinyl versatate, vinyl nitriles, acrylonitrile, vinyl aromatic compounds, such as styrene, and mixtures thereof.

In one embodiment, the copolymer comprises, based on 1000 constitutional repeating units:

from 500 to 999, more typically from 800 to 999, even more typically from 900 to 990, first constitutional repeating units, and from 1 to 500, more typically from 1 to 200, even more typically from 10 to 100 second constitutional repeating units.

In one embodiment, the copolymer is made by copolymerizing a mixture of monomers that comprises more first monomers and one or more second monomers that each independently comprise at least one cationic moiety per molecule of such monomer. In one embodiment, the copolymer is made by copolymerizing a mixture of monomers that comprises one or more first monomers and one or more second monomers that each independently comprise at least one anionic moiety per molecule of such monomer. In one embodiment, the copolymer is made by copolymerizing a mixture of monomers that comprises one or more first monomers and one or more second monomers that each independently comprise at least one amphoteric/zwitterionic moiety per molecule of such monomer. In one embodiment, the copolymer is made by copolymerizing a mixture of monomers that comprises one or more first monomers and one or more second monomers that each independently comprise at least one nonionic moiety per molecule of such monomer. In one embodiment, the copolymer is made by copolymerizing a mixture of monomers that comprises one or more first monomers, one or more second monomers that each independently comprise at least one cationic moiety per molecule of such monomer, and one or more second monomers that each independently comprise at least one anionic moiety per molecule of such monomer. In one embodiment, the copolymer is made by copolymerizing a mixture of monomers that comprises one or more first monomers, one or more second monomers that each independently comprise at least one cationic moiety per molecule of such monomer, and one or more second monomers that each independently comprise at least one amphoteric/zwitterionic moiety per molecule of such monomer. In one embodiment, the copolymer is made by copolymerizing a mixture of monomers that comprises one or more first monomers, one or more second monomers that each independently comprise at least one cationic moiety per molecule of such monomer, and one or more second monomers that each independently comprise at least one nonionic moiety per molecule of such monomer. In one embodiment, the copolymer is made by copolymerizing a mixture of monomers that comprises one or more first monomers, one or more second monomers that each independently comprise at least one anionic moiety per molecule of such monomer, and one or more second monomers that each independently comprise at least one amphoteric/zwitterionic moiety per molecule of such monomer. In one embodiment, the copolymer is made by copolymerizing a mixture of monomers that comprises one or more first monomers, one or more second monomers that each independently comprise at least one anionic moiety per molecule of such monomer, and one or more second monomers that each independently comprise at least one nonionic moiety per molecule of such monomer. In one embodiment, the copolymer is made by copolymerizing a mixture of monomers that comprises one or more first monomers, one or more second monomers that each independently comprise at least one amphoteric/zwitterionic moiety per molecule of such monomer, and one or more second monomers that each independently comprise at least one nonionic moiety per molecule of such monomer.

In one embodiment, the copolymer is made by copolymerizing a mixture of monomers, comprising, based on 1000 moles of such monomers:

(a) from 800 to 999 moles of one or more first monomers, each independently comprising at least one reactive functional group per molecule and at least one pendant saturated or unsaturated, five-, six-, or seven-membered acylamino- or diacylamino-containing heterocyclic ring moiety per molecule, and (b) from 1 to 200 moles of one or more second monomers, each independently comprising at least one reactive functional group per molecule and at least one pendant organic moiety that comprises at least one primary, secondary, or tertiary amino nitrogen atom or quaternary nitrogen atom per molecule.

The copolymer of the present invention typically has weight average molecular weight of greater than or equal to 5,000 grams per mole (g/mol), more typically, a weight average molecular weight of from about 10,000 to about 2,000,000 g/mol, even more typically from about 10,000 to about 500,000 g/mol, and still more typically from about 10,000 to about 100,000 g/mol.

In one embodiment, the copolymer is a random copolymer, comprising chains of randomly arranged first constitutional repeating units and second constitutional repeating units. In one embodiment, the copolymer is a block copolymer, comprising blocks of two or more consecutive first constitutional repeating units and blocks of two or more consecutive second constitutive units.

Methods for making suitable copolymers are known in the art. In one embodiment, the polymer according to the present invention is made by copolymerization of ethylenically unsaturated monomers according to known free radical polymerization processes. In one embodiment, the copolymer is made by a controlled free radical polymerization techniques, such as the known controlled free radical polymerization processes of atom transfer radical polymerization ("ATRP"), reversible addition fragmentation transfer ("RAFT" polymerization), or macromolecular design via interchange of xanthates ("MADIX" polymerization).

If the second monomer comprises a reactive group that is cyclizable to form a five or six-membered heterocylic ring that comprises at least one quaternized or quaternizable nitrogen atom as a ring member, the cyclization to form the heterocylic ring structure may be conducted simultaneously with the copolymerization with the first monomer, such as by, for example, simultaneous polymerization and cyclization of a quaternized or quaternizable nitrogen atom-containing diallyl monomer, or conducted subsequent to such polymerization.

If the second monomer comprises a quaternizable nitrogen atom as a ring member, then the nitrogen may be quaternized subsequent to the polymerization reaction.

In one embodiment, the copolymer is a random copolymer made by free radical polymerization of vinyl pyrrolidone, vinyl caprolactam, or vinyl pyrrolidone and vinyl caprolactam with one or more ethylenically unsaturated cationic monomers.

In one embodiment, the copolymer is a random copolymer made by free radical polymerization of a monomer mixture comprising from about 80 pbw to less than 100 pbw, more typically from about 90 pbw to about 99 pbw, of vinyl pyrrolidone and from greater than 0 to about 20 pbw, more typically from about 1 to about 10 pbw, of a diallyldimethylammonium salt.

In one embodiment, the at least one silver compound comprises silver nitrate, the at least one polyol comprises ethylene glycol, the total amount of silver nitrate added to the reaction mixture is from $1.5 \times 10^{-3}$ mole to about 1 mole silver nitrate per Liter of reaction mixture, the reaction is conducted in the presence of, based on the weight of the reaction mixture, from about 0.01 wt % to about 50 wt %, more typically from about 0.1 wt % to about 20 wt %, and even more typically from about 0.5 wt % to 8 wt %, of a random copolymer made by free radical polymerization of a monomer mixture comprising from about 80 pbw to less than 100 pbw, more typically from about 90 pbw to about 99 pbw, of vinyl pyrrolidone and from greater than 0 to about 20 pbw, more typically from about 1 to about 10 pbw, of a diallyldimethylammonium salt.

The process of the present invention typically produces a high yield of silver nanowires. In one embodiment, greater than or equal to 70 wt % of silver feed is converted to nanowires and less than 30 wt % of silver feed is converted to isotropic nanostructures, more typically greater than or equal to 80 wt % of silver feed is converted to nanowires and less than 20 wt % of silver feed is converted to isotropic nanoparticles, and even more typically more than 90 wt % of silver feed is converted to nanowires and less than 10 wt % of silver feed is converted to isotropic nanostructures. In one embodiment, greater than or equal to 99 wt % of silver feed is converted to nanowires and less than 1 wt % of silver feed is converted to isotropic nanostructures.

In one embodiment, the silver nanostructures comprise elongated silver nanostructures, known as "silver nanowires" having a diameter of from about 10 nm to about 2 μm, more typically from about 10 nm to about 150 nm, even more typically from about 10 nm to about 60 nm, and a length of from about 5 μm to about 300 μm, more typically from about 10 to about 200 μm.

In one embodiment, the silver nanostructures comprise silver nanowires having a diameter of from about 10 nm to about 150 nm, even more typically from about 10 nm to about 60 nm, and an aspect ratio, that is, a length to diameter ratio, of greater than 100, or greater than 150, or greater than 200, or greater than 300.

In one embodiment, the nanowires made by the process of the present invention exhibit an aspect ratio that is, on average, greater than that of nanowires made by an analogous product wherein poly(vinyl pyrrolidone) is substituted for the copolymer component of the process of the present invention. In one embodiment, the nanowires made by the process of the present invention exhibit an aspect ratio that is, on average, greater than that of nanowires made by an analogous product wherein poly(vinyl pyrrolidone is substituted for the copolymer component of the process of the present invention by a factor of a least 2, more typically by a factor of at least 3.

The product mixture comprises polyol, copolymer, and silver nanostructures, wherein the silver nanostructures comprise silver nanowires and may comprise silver nanostructures other than silver nanowires, such as, isotropic silver particles.

The silver nanostructures may be isolated from the polyol and copolymer components of the product mixture by, for example, gravity separation, centrifugation, or filtration. In one embodiment, the silver nanostructures are then washed in water, an alcohol, typically a ($C_1$-$C_3$)alkanol, or a mixture of water and alkanol, to remove residues of the polyol and copolymer from the isolated nanowires.

Silver nanowires produced by the process of the present invention may be separated from other non-nanowire silver nanostructure components that may be present in the product mixture by dispersing the silver nanostructures in a polar aprotic organic liquid, such as acetone or acetonitrile, followed by isolation of the nanowires from the liquid by gravity separation or centrifugation. The silver nanowires tend to agglomerate and precipitate from the polar aprotic liquid, while isotropic silver nanostructures tend to remain suspended in the polar aprotic organic liquid.

In one embodiment, the product mixture is subjected to gravity separation, the silver nanowire fraction of the separated product mixture is re-dispersed in acetone and subjected to gravity separation and the silver nanowire fraction of the separated acetone dispersion is the re-dispersed in water, alcohol or a mixture thereof.

The residue of the copolymer used in the process of the present invention is more easily cleaned from the silver nanostructure product than the poly(vinylpyrrolidone) homopolymer of prior art processes, which typically require multiple iterations of water or water and alcohol washing to remove from the silver nanostructure product. For example, the copolymer residue may typically be removed from the silver nanostructures in a single water/alkanol washing step, while removal of poly(vinyl pyrrolidone homopolymer residue from silver nanostructures typically requires form 5 to 10 iterations of an analogous water/alkanol washing step. Reducing the amount of or eliminating the copolymer or homopolymer from the dispersion of silver nanowires is of great benefit in using the silver nanowires to easily make electrically conductive polymer films having very high conductivity. The silver nanowires of the dispersion of the present invention can be used to make polymer films having high electrical conductivity without requiring the extra steps required by prior art processes, such as iterative washing steps or heat treating or heating and compressing the silver nanowire network to displace a coating of vinylpyrrolidone residue from the surfaces of the nanowires and allow metal to metal contact between the nanowires of the network.

In one embodiment, silver nanowires are provided in the form of a dispersion comprising silver nanowires dispersed in liquid medium comprising water, a $(C_1-C_6)$alkanol, or a mixture thereof. Including an alkanol component in the liquid medium of the dispersion is of benefit in reducing oxidation of the silver nanostructure component of the dispersion.

In one embodiment, the nanowire dispersion comprises silver nanowires dispersed in aqueous medium wherein the dispersion comprises less than 100 pbw, or less than 10 pbw, or less than 5 pbw or less than 1 pbw of the copolymer per 1,000,000 pbw of silver nanowires. In one embodiment, the dispersion comprises no detectable amount of the copolymer.

The silver nanowires made by the process of the present invention are useful in combination with an electrically conductive polymer, as a component of an electrically conductive film. Suitable electrically conductive polymers include electrically conductive polythiophene polymers, electrically conductive poly(selenophene) polymers, electrically conductive poly(telurophene) polymers, electrically conductive polypyrrole polymers, electrically conductive polyaniline polymers, electrically conductive fused polycylic heteroaromatic polymers, and blends of any such polymers.

In one embodiment, the electrically conductive polymer comprises a doped electrically conductive polymer known as PEDT:PSS, which comprises poly(3,4-ethylenedioxythiophene or "PEDOT" and a water soluble polymeric acid dopant comprising a poly(styrene sulfonic acid) or "PSS". Such electrically conductive polymer films typically exhibit high conductivity and high optical transparency and are useful as a layer in an electronic device. Suitable electronic devices include any device that comprises one or more layers of semiconductor materials and makes use of the controlled motion of electrons through such one or more layers, such as, for example: devices that converts electrical energy into radiation, such as, for example, light-emitting diodes, light emitting diode displays, diode lasers, or lighting panels, devices that detect signals through electronic processes, such as, for example, photodetectors, photoconductive cells, photoresistors, photoswitchs, phototransistors, phototubes, infrared ("IR") detectors, or biosensors, devices that convert radiation into electrical energy, such as, for example, photovoltaic devices or solar cells, and devices that includes one or more electronic components with one or more semiconductor layers, such as, for example, transistors or diodes.

In one embodiment, the process of the present invention permits the use of a higher concentration of silver compound, for example silver nitrate, in the reaction mixture which enables production of a product mixture having a higher concentration of silver nanostructures, more typically silver nanowires, than an analogous process wherein poly(vinyl (pyrrolidone) homopolymer is used in place of the copolymer component of the process of the present invention.

In one embodiment, the process of the present invention enables production of silver nanowires having a higher aspect ratio than silver nanowires made by an analogous process wherein poly(vinyl(pyrrolidone) homopolymer is used in place of the copolymer component of the process of the present invention.

In general, silver nanostructures made by the process of the present invention are more easily cleaned than silver nanostructures made by an analogous process wherein poly(vinyl (pyrrolidone) homopolymer is used in place of the copolymer component of the process of the present invention, because residues of the copolymer component of the process of the present invention is more easily removed from silver nanowires structures than are residues of poly(vinyl pyrrolidone) homopolymer.

Examples 1A-1E and Comparative Example C1

The poly(vinylpyrrolidone-co-diallyldimethylammonium nitrate) random copolymers ("poly(VP-co-DADMAN") of Examples 1A-1E were each made by copolymerizing vinylpyrrolidone monomer with diallyldimethylammonium nitrate monomer ("DADMAN").

DADMAN monomer was made by exchanging the chloride counter ion of diallyldimethylammonium chloride monomer ("DADMAC", shown in structure (b) above) with nitrate counter ions, using silver nitrate, according to reaction: $C_8H_{16}N^+Cl^-+AgNO_3 \rightarrow AgCl+C_8H_{16}N^+NO_3^-$. The exchange of chloride for nitrate ions was done by adding the adequate amount of a solution of silver nitrate in water (1:1 molar ratio between $Cl^-$ and $NO_3^-$) into X/0.6 g of a solution of 60 wt % DADMAC in water, where X=1, 2, 4, 8, or 16. The exchanges each occurred quickly and produced a white silver chloride precipitate that was easily separated from the DAMAN monomer product solutions by centrifugation (5 min at 2000 rpm). The precipitates were washed one time with 5 ml of water and centrifuged again in order to retrieve all the monomer. The total exchanged monomer solutions were then filtered with a 0.2 μm filter prior to use in copolymerization reactions, as described below.

VP and DADMAN monomers were copolymerized according to the general Scheme A below, using controlled radical polymerization using azobisisobutyronitrile (AIBN) as the polymerization initiator and a thiocarbonylthio transfer agent, to produce a linear poly(VP-co-DADMAN) copolymer.

Scheme A

Initiation:

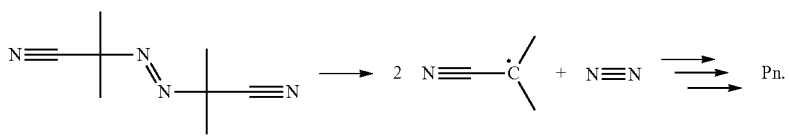

Reversible chain transfer:

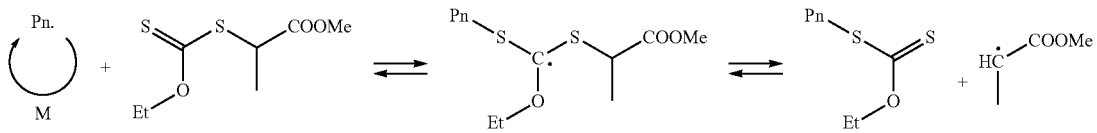

Reinitiation:

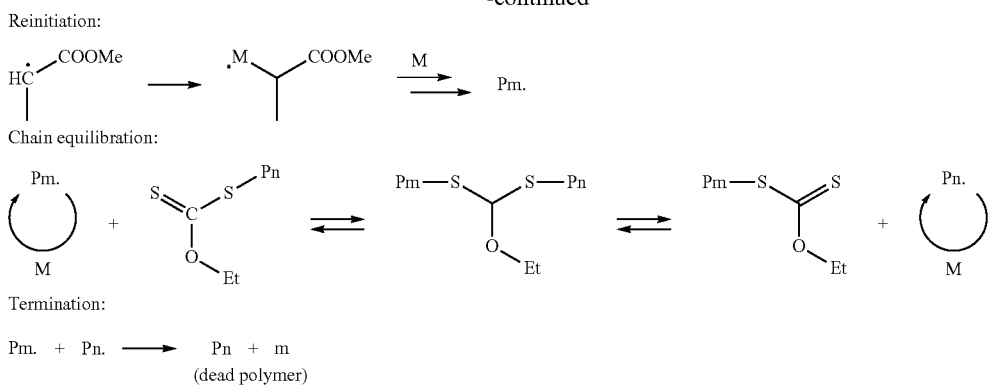

Chain equilibration:

Termination:

Pm. + Pn. → Pn + m
(dead polymer)

In a 500 ml jacketed reactor, 90 g of vinylpyrrolidone (VP), 0.2 ml of the thiocarbonylthio transfer agent and an aqueous DADMAN solution were heated to 68° C. under nitrogen. A solution of 0.5 g of AIBN in 10 g of VP was then added stepwise in the solution, according to the following schedule:
at t=0.2 ml of the AIBN/VP solution was added to the solution,
at t=20 min, the temperature had increased to about 75° C., due to exothermic polymerization reaction, and 0.5 ml of AIBN/VP solution were added, and
at t=55 min, the temperature in the reactor was about 78° C., 150 ml of water pre-heated to 68° C. were added to the reaction mixture with the rest of the AIBN/VP solution.

Figure 1B:
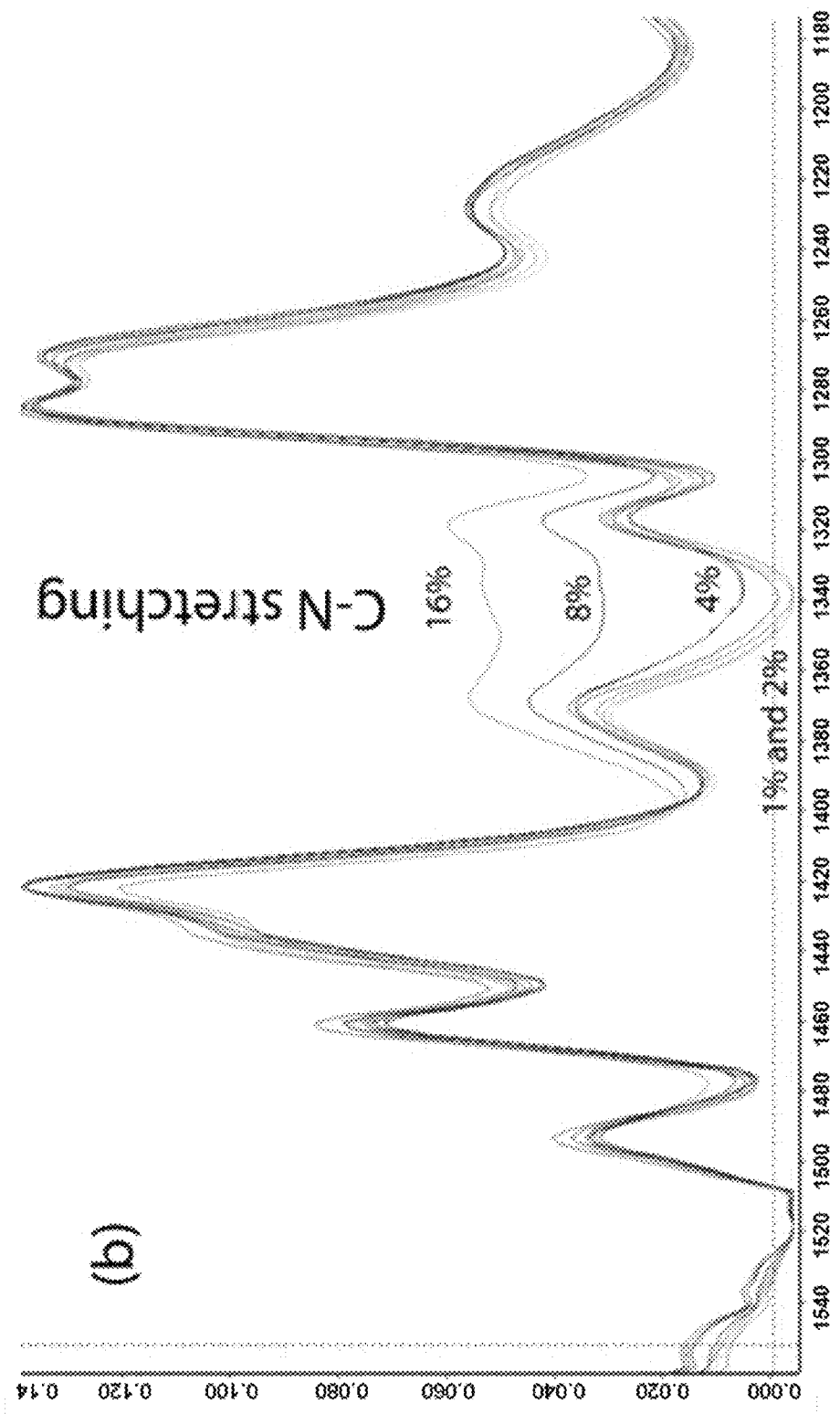

Following addition of the water and final AIBN/VP solution, the reaction mixture was kept at 68° C. for 4 more hours and then allowed to cool at room temperature for another 6 to 10 hours. The viscous product solution so produced was then precipitated in 750 ml of acetone and washed twice with 100 ml aliquots of acetone. The washed product was then dried at 70° C. under vacuum with nitrogen purge for one day, and then ground and dried again before use. The theoretical weight average molecular weight obtained by above described polymerization process is about 100,000 g/mol. The yield of this process was typically about 75%. Representative 1H NMR and FTIR spectra of the copolymer product are shown in FIGS. 1(a) and 1(b).

The poly(vinyl pyrrolidone) homopolymer of Comparative Example C1 was made by a process analogous to that used to make the copolymers of Examples 1A-1E, but using only vinyl pyrrolidone monomer, that is, no DADMAN monomer was included in the reaction mixture.

TABLE I

| Example # | DADMAN content (wt %) |
|---|---|
| C1 | 0 |
| 1A | 1 |
| 1B | 2 |
| 1C | 4 |
| 1D | 8 |
| 1E | 16 |

Examples 2A-2G and Comparative Examples C2A-C2C

The silver nanowires of Examples 2A-2G were made according to the general synthesis process described below, wherein the composition of the copolymer and the amount of silver nitrate added to the reaction mixture were varied. In each case, a respective one of the poly(VP-co-DADMAN) copolymers of Example 1A-1E was used as a protectant.

Typically, 35 g of ethylene glycol with 0.0055 g of lithium chloride were heated to 173° C., with nitrogen purge, for 1 hour. The poly(VP-co-DADMAN) copolymer (typically in an amount of 1.5 g) was added at the end of this pre-treatment. A feed solution consisting of a given amount (between 0.3 and 1.5 g) of silver nitrate dissolved in 7.5 g of ethylene glycol was used to introduce silver nitrate and more ethylene glycol into the reaction mixture. In a seeding step, an initial amount of silver nitrate (0.05 g, typically in the form of 0.34 mL of a feed solution containing 1 g of silver nitrate in 7.5 g of ethylene glycol) was then fed into the reaction mixture, upon which the reaction mixture turned brown in color. After 6 minutes, the remainder of the silver nitrate feed solution was added to the reaction mixture using a syringe, at a rate of 1.5 ml/min. As the silver nitrate feed was added, the reaction mixture darkened, turned grey in color, and then, typically within about 7 minutes after the beginning of the addition of the silver nitrate feed, nanowires became visible in the reaction mixture. Depending on the total amount of silver nitrate added, the reaction took from about 15 to about 30 minutes reach completion.

Figure 5:
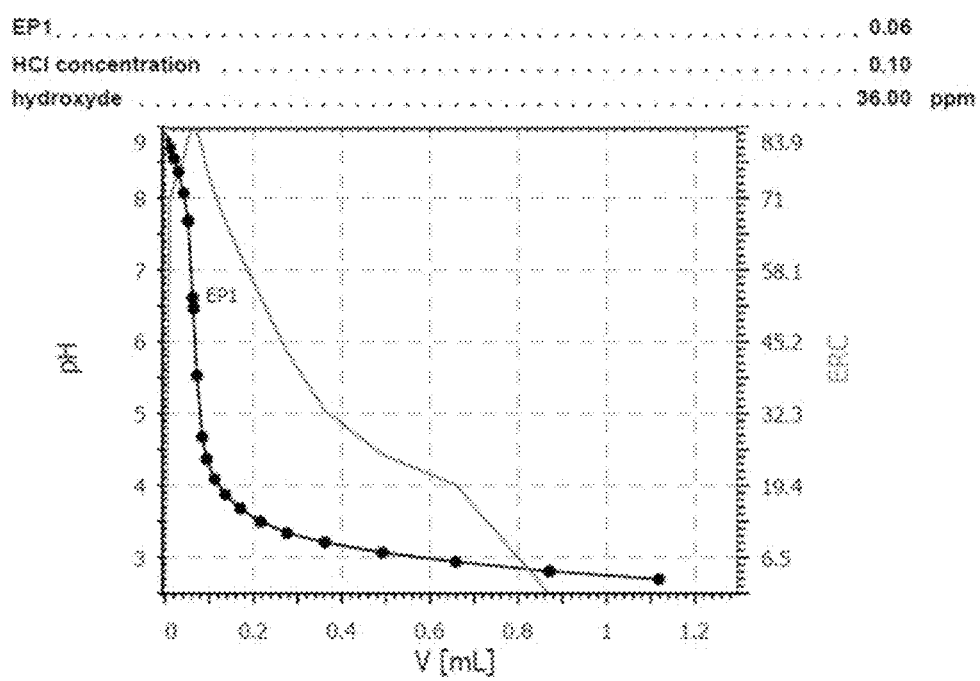
FIG. 5 shows the titration curve of the "Lot A" ethylene glycol used in Examples 2, 3, 4, and comparative examples C2A-C2C.

The pH of the ethylene glycol used (high-purity anhydrous ethylene glycol; Sigma-Aldrich Lot SHBB8374V; "Lot A") in the reaction mixture was determined to be 8.9 by dilution and titration. The pH of the pure ethylene glycol can be read on the vertical axis, for V=0 mL, of the titration curve shown in FIG. 5. Lot A ethylene glycol was used in the present examples 2A-2G and Comparative Examples C2A-C2C as well as following Examples 3 and 4.

The silver nanowires of Comparative Examples C2-A to C2-C were made by an analogous process to that used to make the silver nanowires of Examples 2A-2G, except that poly (VP) homopolymer of Comparative Example C1 was substituted for poly(VP-co-DADMAN) copolymer.

For each synthesis, the reaction was left to react until complete reduction of silver nitrate. The nanowires of Examples 2A-2G were isolated form the reaction mixture by gravity separation and the poly(VP-co-DADMAN residues were removed from the nanowires by washing with a mixture of water and alkanol. The nanowires of Comparative Examples C1-C3 were isolated from the reaction mixture by gravity separation and removal of the poly(VP) residues from the nanowires required multiple (at least 5) iterations of the water/alkanol washing step. In each case, silver nanowires were separated from isotropic silver nanostructures by agglomerating the silver nanowires in a mixture of acetone and water and collecting the agglomerated silver nanowires.

An optical microscope was used to follow the evolution of each reaction and to determine the physical characteristics of the product nanostructures. The polymer or copolymer used in the nanowire synthesis reaction (and in the case of poly (VP-co-DADMAN) copolymers, the DADMAN content of the copolymer) and amount of $AgNO_3$ used in to make the silver nanowires of Examples 2A-2G and Comparative Examples C2A-C2C and the numerical average length of the respective silver nanowires are summarized in TABLE II below.

TABLE II

| Nanowire Ex# | Polymer or Copolymer used in synthesis Ex # | $AgNO_3$ (wt %) | $AgNO_3$ Amount (g) | Nanowire length (μm) |
|---|---|---|---|---|
| 2A | 1A (1 wt % DADMAN) | 1.25 | 0.5 | 15 |
| 2B | 1A (1 wt % DADMAN) | 2.5 | 1 | 25 |
| 2C | 1B (2 wt % DADMAN) | 2.5 | 1 | 16 |
| 2D | 1B (2 wt % DADMAN) | 2.9 | 1.16 | 18 |
| 2E | 1D (8 wt % DADMAN) | 1.25 | 0.5 | 5 |
| 2F | 1D (8 wt % DADMAN) | 2.5 | 1 | 20 |
| 2G | 1D (8 wt % DADMAN) | 3.75 | 1.5 | 27 |
| C2A | C1 (poly(VP) homopolymer) | 1 | 0.4 | 10 |
| C2B | C1 (poly(VP) homopolymer) | 1.25 | 0.5 | 12 |
| C2C | C1 (poly(VP) homopolymer) | 2.5 | 1 | produced an agglomerate of unrecoverable nanostructures |

Figure 2:
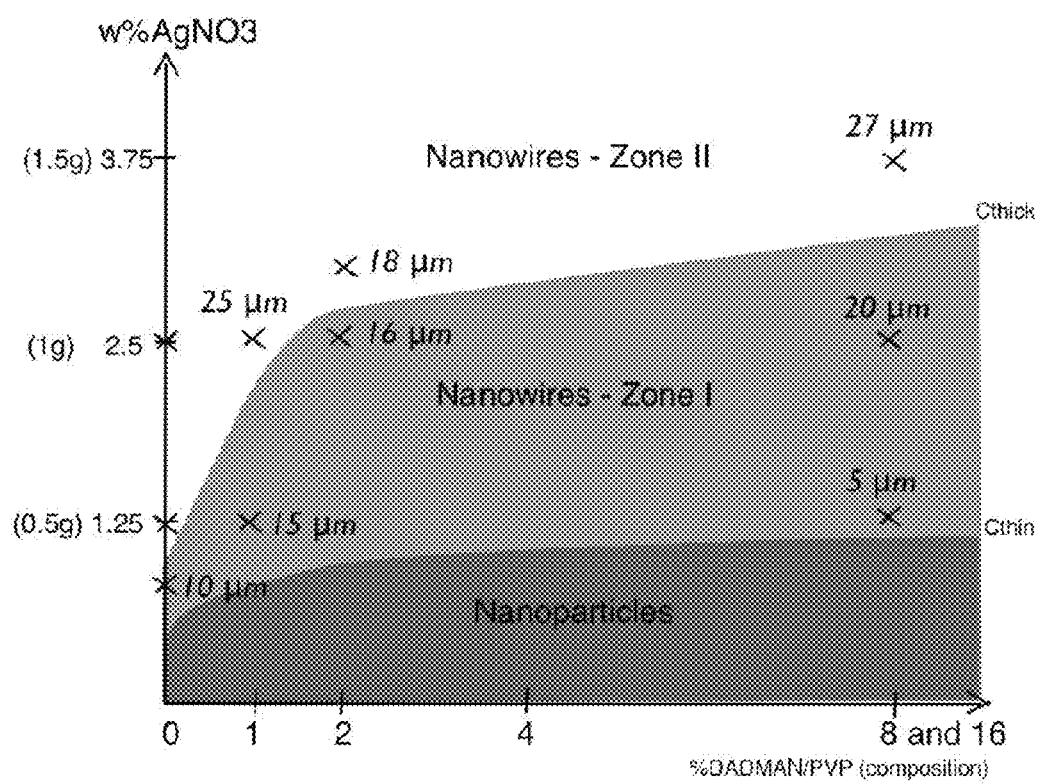
FIG. 2 shows characteristics of the silver nanostructures of Examples 2A-2G and Comparative Examples C1-C3, as a function of the amount of silver nitrate added and the composition of the polymeric protectant, wherein each cross corresponds to one of the Examples.

The results are also summarized in FIG. 2 as a plot of nanowire diameter as a function of the amount of $AgNO_3$ used in the nanowire synthesis and amount of DADMAN in the copolymer used in the nanowire synthesis. The product nanostructures were classified as "thin nanowires" (nanostructures less than or equal to 150 nm in diameter and greater than 5 μm in length), "thick nanowires" (nanostructures greater than 150 nm in diameter and greater than 5 μm in length) and/or "nanoparticles" (nanostructures less than or equal to 5 μm in length). The plot allows the visualization of three regions, that is, a "Nanoparticles" region, wherein the silver nanostructure product was predominately nanoparticles and two nanowire regions, "Nanowires—Zone I", wherein the silver nanostructure product was predominately thin nanowires, and "Nanowires—Zone II", wherein the silver nanostructure product was a mixture of thin nanowires and thick nanowires, with a boundary line "$C_{thin}$" between the Nanoparticles region and Nanowires Zone I, and a boundary line "$C_{thick}$" between Nanowires—Zone I and Nanowires—Zone II.

The results plotted FIG. 2 indicate that using poly(VP-co-DADMAN) copolymer instead of poly(VP) homopolymer shifts production of thin silver nanowires toward higher concentration of silver nitrate and that synthesis of thin silver nanowires can be achieved at concentrations up to 3 times higher than in pure poly(VP) homopolymer and that this effect increases dramatically as DADMAN content of the poly(VP-co-DADMAN) copolymer increases from 0 to about 2 wt % and continues to increase, although less dramatically as the DADMAN content further increased from 2 wt % to 8%. Increasing DADMAN content above 8 wt % did not appear to provide any further significant benefit, in that poly(VP/DADMAN) copolymer having a DADMAN content of 8 wt % and poly(VP/DADMAN) copolymer having a DADMAN content of 16% each appeared to give the substantially same results.

Figure 6:
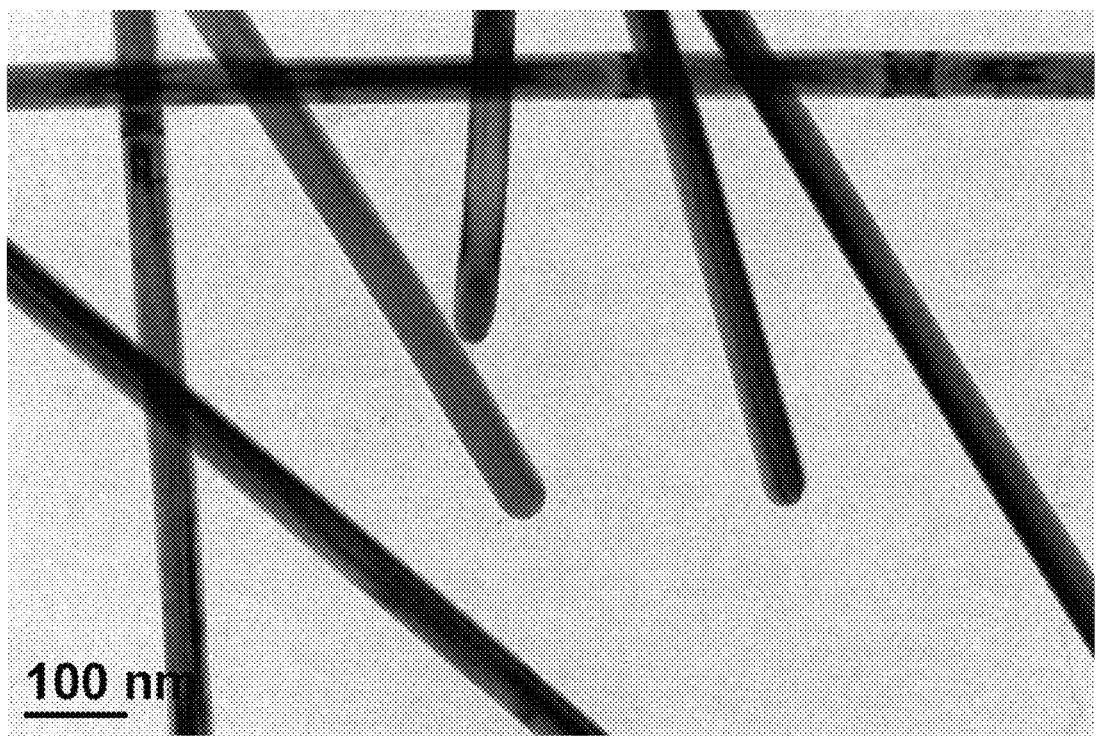
FIG. 6 shows a TEM image of the silver nanowires of Example 2A.

The diameter of the silver nanowires can be determined by transmission electron microscopy (TEM) and/or scanning electron microscopy (SEM). A TEM image of the silver nanowire of Example 2A is shown in FIG. 6. The diameter of the silver nanowires of Example 2A is 55 nm.

Example 3

The silver nanostructures of Examples 3A-3C were made substantially in accord with the process used to make the nanowires of Examples 2A-2G, as described above, using 0.5 g of the poly(VP-co-DADMAN) copolymer of Example 1E (16 wt % DADMAN content), except that the amount of silver nitrate added to the reaction mixture was varied. The length distribution of the as produced nanostructures was determined using the image analysis software "ImageJ" on picture taken with an optical microscope.

Figure 3:
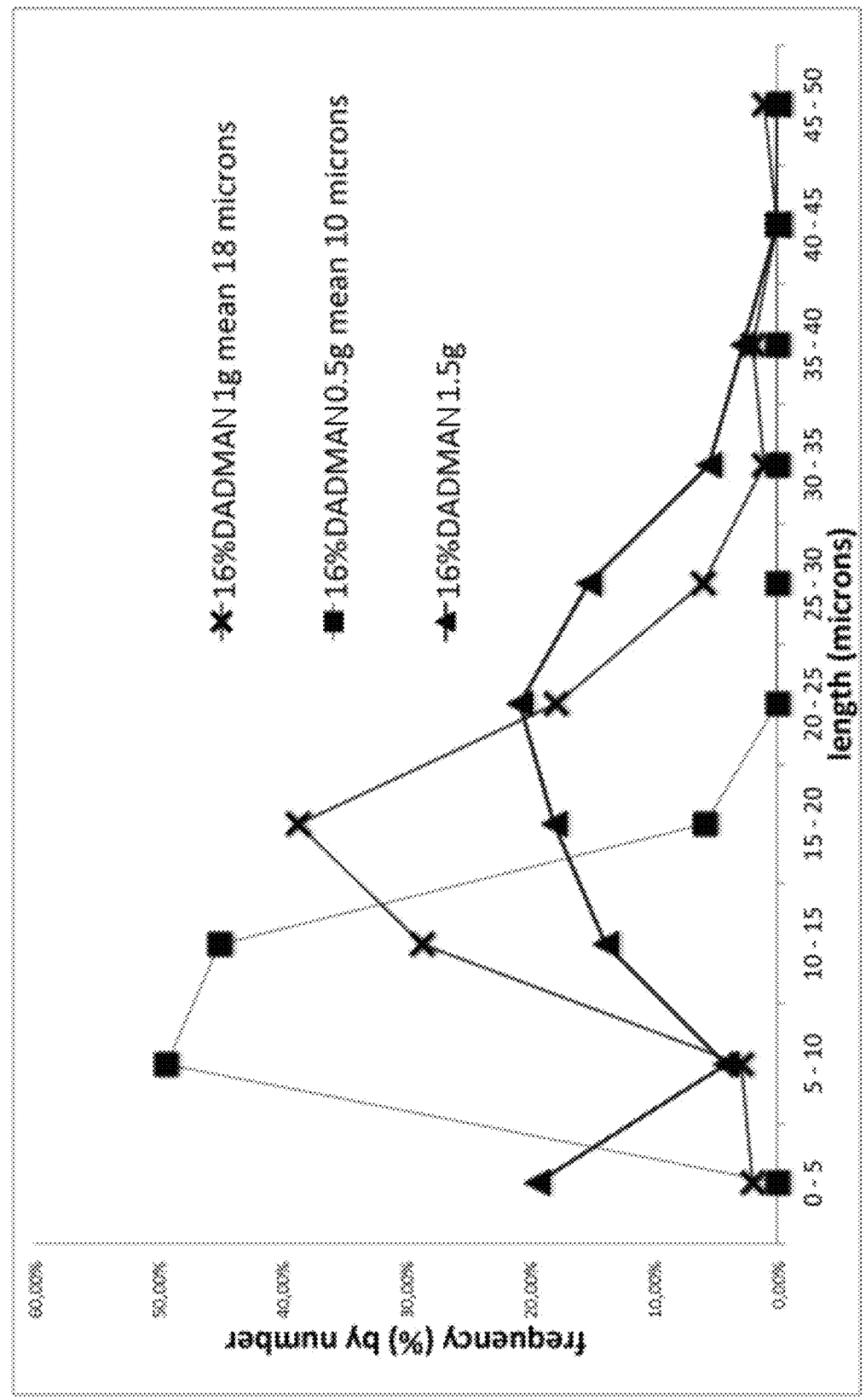
FIG. 3 shows length distributions of the nanowire products obtained using poly(VP-co-DADMAN) copolymer with 16 percent by weight ("wt %") DADMAN content at different concentrations of silver nitrate.

FIG. 3 shows the size distributions of the nanostructure products of Examples 3A-3C. The amount of AgNO3 used in each synthesis, as well as the symbol used to represent the nanostructure product in FIG. 3, is listed in TABLE III below.

TABLE III

| Example # | Symbol In FIG. 3 | $AgNO_3$ (wt %) | $AgNO_3$ amount (g) |
|---|---|---|---|
| 3A | square | 1.25 | 0.5 |
| 3B | X | 2.5 | 1 |
| 3C | triangle | 3.75 | 1.5 |

For $AgNO_3$ concentrations of 1.25 wt % and 2.5 w %, only thin nanowires were produced, wherein the nanowires produced at 2.5 wt % $AgNO_3$ were significantly longer (mean length of about 20 μm) than those produced at 1.25 wt % $AgNO_3$ (mean length of about 10 μm. At a $AgNO_3$ concentration of 3.75 wt %, a mixture of thin nanowires and thick nanowires was produced.

Example 4

The silver nanowires of Examples 4 A and 4 B were made according the process described above in Examples 2A-2G, using poly(VP-co-DADMAN) having a l wt % DAMAN content at two different amounts of $AgNO_3$.

Figure 4:
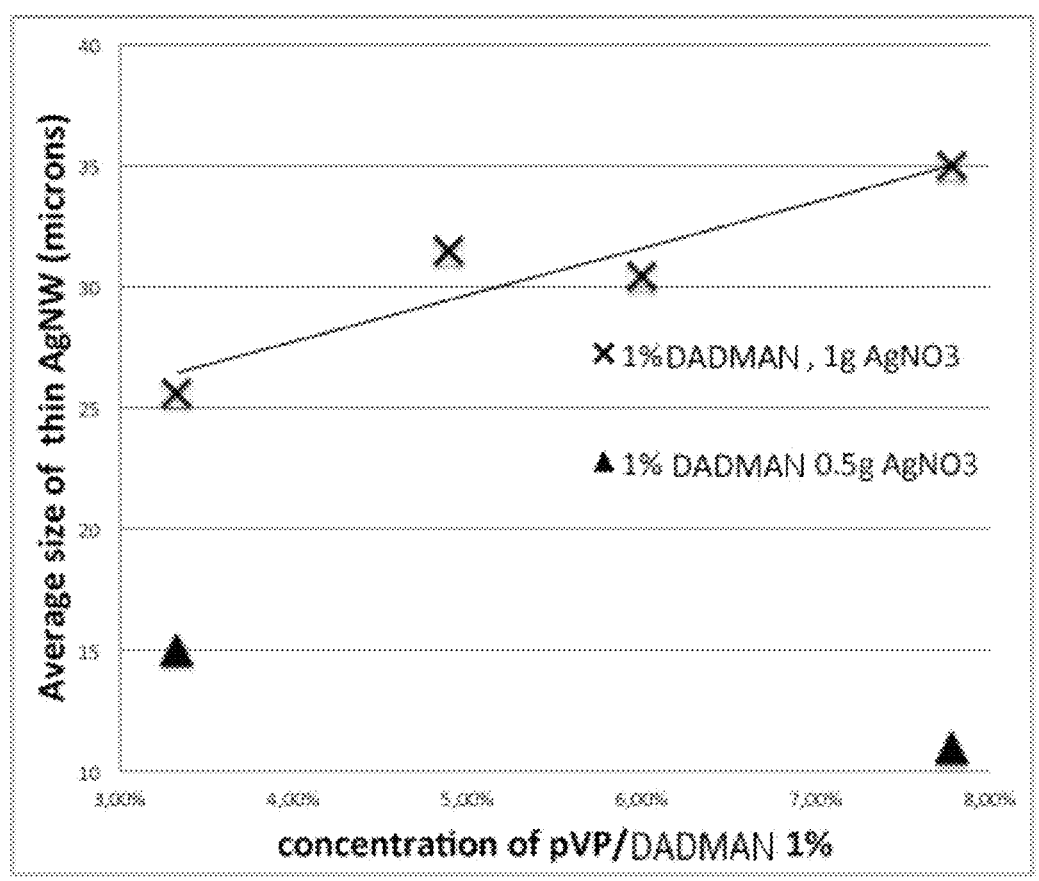
FIG. 4 shows arithmetic average length distribution of nanowire products obtained using poly(VP-co-DADMAN) copolymer with 1 wt % DADMAN content at different concentrations of the copolymer at two different amounts of silver nitrate.

FIG. 4 shows the size distributions of the nanostructure products Examples 4A and 4B. The amount of $AgNO_3$ used in each synthesis, as well as the symbol used to represent the nanostructure product in FIG. 4, is listed in TABLE IV below.

TABLE IV

| Example # | Symbol in FIG. 4 | Zone of FIG. 2 | $AgNO_3$ (wt %) | $AgNO_3$ amount (g) |
|---|---|---|---|---|
| 4A | triangle | I | 1.25 | 0.5 |
| 4B | X | II | 2.5 | 1 |

Example 5

Reduced-Water Synthesis of Poly(VP-co-DADMAN) Having a 1 Wt % DADMAN Content

The synthesis of poly(VP-co-DADMAN) is composed of two steps:

The first step was a counter-ion exchange to form DADMAN (Diallydimethylammonium nitrate) from commercially-available DADMAC (Diallydimethylammonium chloride). To exchange the counter-ion, a solution of 13.54 g of AgNO$_3$ dissolved in 6.44 g of deionized water was added to 21.00 g of DADMAC in water (65 wt %). The molar ratio of AgNO$_3$ to DADMAC is 1 to 1.05 in order to remove all of the AgNO$_3$ (which would otherwise give a black color to the solution). After vortex stirring, two phases appeared. The liquid supernatant, which contained DADMAN in water, is collected. The white silver solid precipitate of AgCl is washed with 5 mL of water and then centrifuged a second time to extract all the DADMAN monomer from it. The combined supernatants were filtered through a 0.20 μm filter and added to 1452 g of vinylpyrrolidone (VP) and 130 g of molecular sieves. The monomers were shaken for an hour after which the sieves were removed. The solution was subsequently introduced into a 5-L three-necked round-bottomed flask reactor.

Initiator solution was prepared separately by adding 2.20 g of AIBN to 20.8 g (about 20 mL) of VP.

The mixture of monomers was heated up to 60° C. and stirred. 6.66 g of thiocarbonylthio transfer agent and 2.5 g of initiator solution were added to the 5-L flask. Then, 2.5 g of the initiator solution was added every 30 minutes. The reaction temperature was maintained between 57 and 62° C. After 7.5 hours, 500 g of methanol was added to the flask to reduce the viscosity of the reactant and the reaction was allowed to stir for up to 12 hours. A yellow viscous transparent liquid was obtained.

Since VP and DADMAN are soluble in diethyl ether and poly(VP-co-DADMAN) is not, the copolymer was isolated from remaining monomer by selective precipitation in this solvent. Two volumes of ether were used for 1 volume of copolymer. The ether was removed from the resulting white precipitate, which was subsequently dried in a hood and then in a vacuum oven. The dried copolymer was ground to obtain a white, slightly yellow, fine powder.

Example 6

Alternative Reduced-Water Synthesis of Poly(VP-co-DADMAN) Having a 1 wt % DADMAN Content The synthesis of poly(VP-co-DADMAN) is composed of two steps:

The first step was a counter-ion exchange to form DADMAN (Diallydimethylammonium nitrate) from commercially-available DADMAC (Diallydimethylammonium chloride). To exchange the counter-ion, a solution of 13.54 g of AgNO$_3$ dissolved in 6.44 g of deionized water was added to 21.00 g of DADMAC in water (65 wt %). The molar ratio of AgNO$_3$ to DADMAC is 1 to 1.05 in order to remove all of the AgNO$_3$ (which would otherwise give a black color to the solution). After vortex stirring, two phases appeared. The liquid supernatant, which contained DADMAN in water, is collected. The white silver solid precipitate of AgCl is washed with 5 mL of water and then centrifuged a second time to extract all the DADMAN monomer from it. The combined supernatants were filtered through a 0.20 μm filter and added to 1452 g of vinylpyrrolidone (VP) and 130 g of molecular sieves. The monomers were shaken for an hour after which the sieves were removed. The solution was subsequently introduced into a 5-L three-necked round-bottomed flask reactor.

Initiator solution was prepared separately by adding 2.20 g of AIBN to 20.8 g (about 20 mL) of VP.

The mixture of monomers was heated up to 60° C. and stirred. 6.66 g of thiocarbonylthio transfer agent and 2.5 g of initiator solution were added to the 5-L flask. Then, 2.5 g of the initiator solution was added every 30 minutes. The reaction temperature was maintained between 57 and 62° C.

After 7.5 hours, 500 g of ethylene glycol was added to the flask to reduce the viscosity of the reactant. The temperature was raised to 70° C., and another 500 g of ethylene glycol was added after one hour. The reaction was allowed stir for up to 12 hours. A yellow viscous transparent liquid was obtained.

The copolymer suspension is used as is in silver nanowire synthesis without further purification.

Example 7

High aspect ratio silver nanowires were achieved using poly(VP-co-DADMAN) in ethylene glycol that required the addition of a base.

Figure 7:
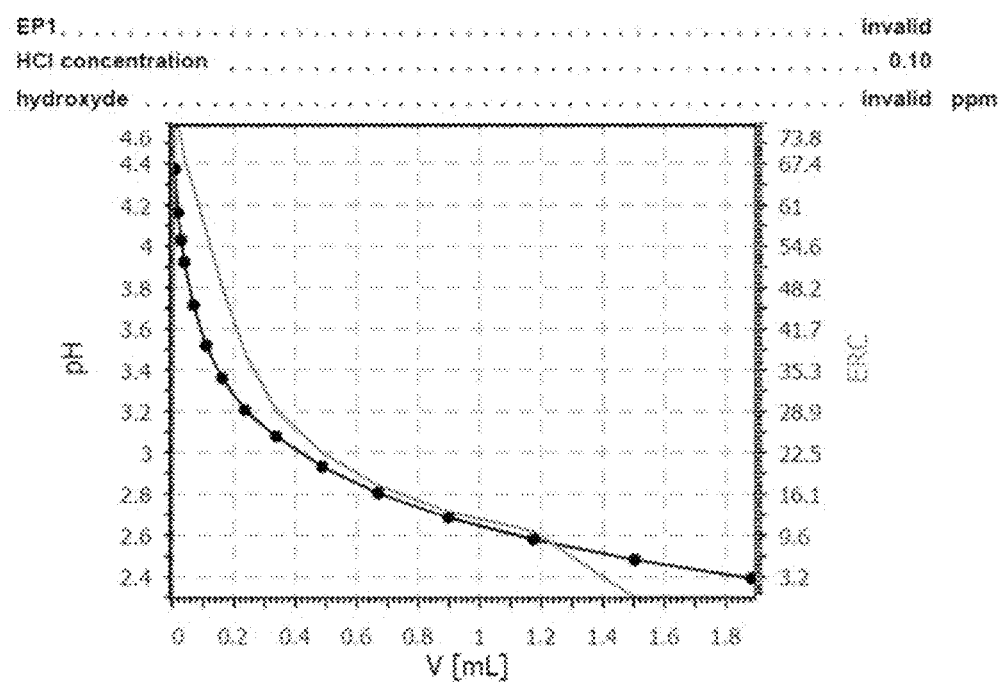
FIG. 7 shows the titration curve of the "Lot B" ethylene glycol used in Examples 7, 8, and 9.

The pH of the ethylene glycol used (high-purity anhydrous ethylene glycol; Sigma-Aldrich Lot SHBC6651V; "Lot B") in the reaction mixture was determined to be 4.6 by dilution and titration. The pH of the pure ethylene glycol can be read on the vertical axis, for V=0 mL, of the titration curve shown in FIG. 7. Lot B ethylene glycol was used in the present Example 7 and in the following Examples 8 and 9.

1.8 mg of lithium chloride (LiCl), 2.4 mg lithium hydroxide (LiOH), and 0.5 g poly(VP-co-DADMAN) having a 1 wt % DAMAN content were added to 44 g of ethylene glycol and heated to 175° C. for 30 minutes under nitrogen atmosphere and moderate agitation (100-300 rpm). In the seeding step, an initial amount of silver nitrate (14 mg AgNO$_3$ dissolved in 0.45 mL ethylene glycol) was then added into the reaction mixture. A silver nitrate feed solution (with 0.37 gm of AgNO$_3$ dissolved in 12 g ethylene glycol) was then fed dropwise to the reaction mixture at a rate of 1.5 mL/minute. The reaction was stopped after 15 minutes from the start of the feed by quenching the solution in ice.

The nanowires of Example 7 were isolated form the reaction mixture by gravity separation and the poly(VP-co-DADMAN residues were removed substantially according to the isolation steps described in the previous Examples.

Figure 8:
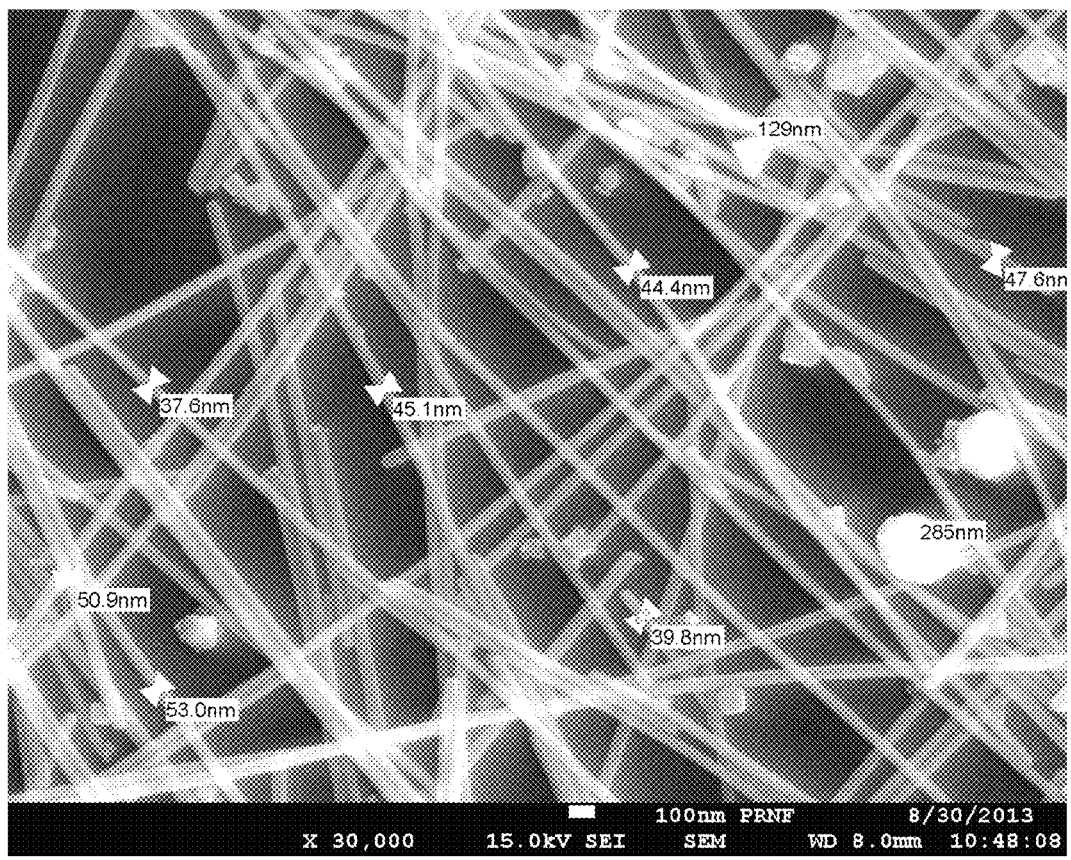
FIG. 8 shows an SEM image of the silver nanowires of Example 7 produced with the addition of lithium hydroxide.
Figure 9:
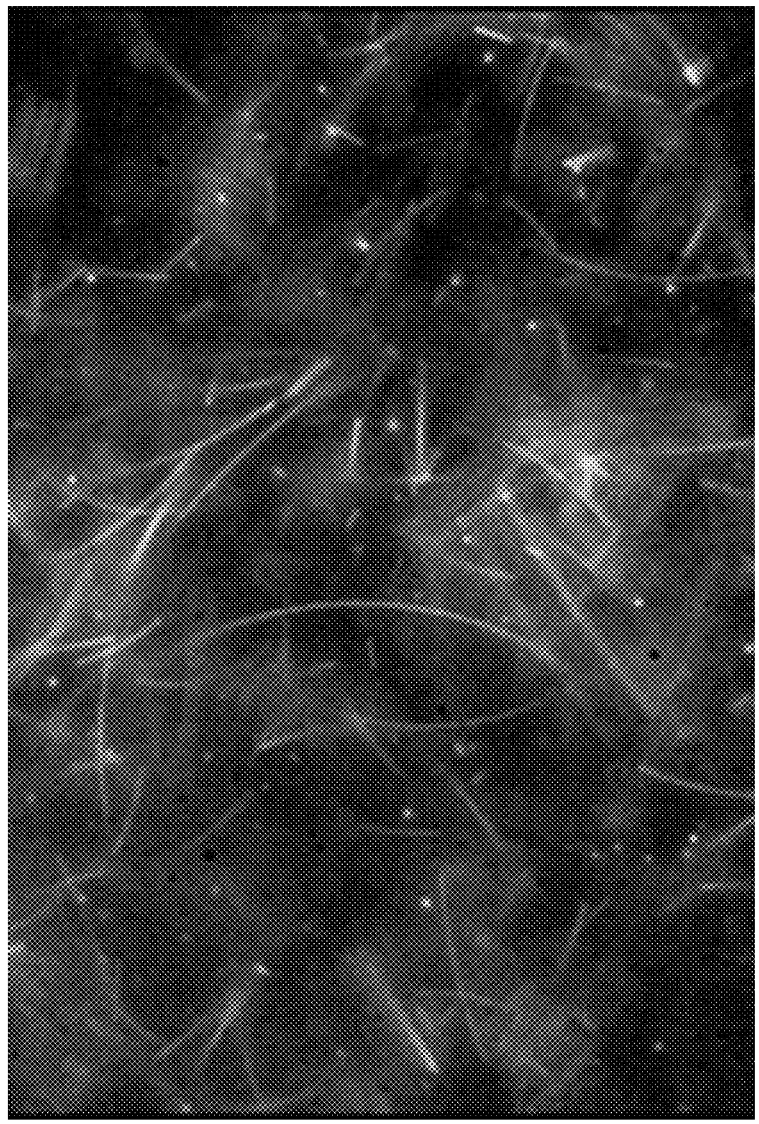
FIG. 9 shows an image of the silver nanowires of Example 7 produced with the addition of lithium hydroxide as seen with an optical microscope.

An SEM image of the nanowires of Example 7 is shown in FIG. 8. The average diameter of the nanowires was found to be about 47 nm, and the average length was found to be about 20 μm. FIG. 9 shows an image of the nanowires of Example 7 as seen through optical microscopy.

Example 8

The silver nanowires of Example 8 were made by an analogous process to that used to make the silver nanowires of Example 7, except that LiOH was replaced with 5.8 mg of potassium hydroxide (KOH).

Figure 10:
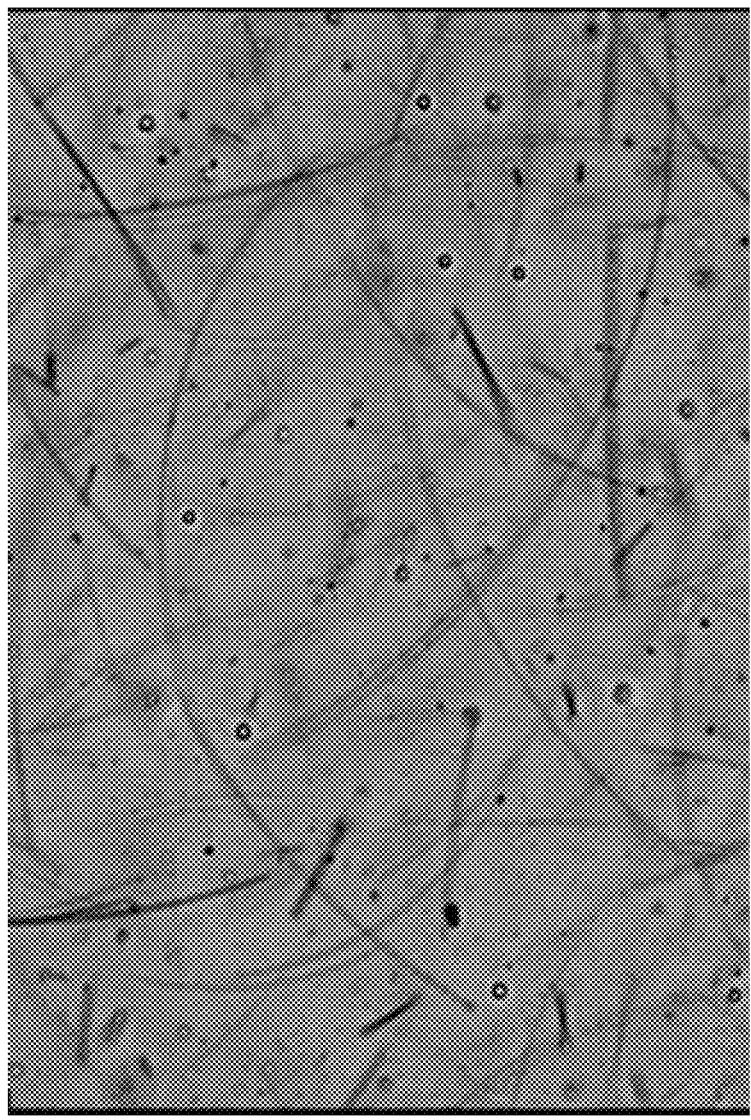
FIG. 10 shows an image of the silver nanowires of Example 8 produced with the addition of potassium hydroxide as seen with an optical microscope.

FIG. 10 shows an image of the nanowires of Example 8 as seen through optical microscopy. The average diameter of the nanowires of Example 8 was found to be about 65 nm, and the average length was found to be about 25 μm.

Example 9

The silver nanowires of Example 9 were made by an analogous process to that used to make the silver nanowires of Example 7, except that LiOH was replaced with 4.1 mg of sodium hydroxide (NaOH).

Figure 11:
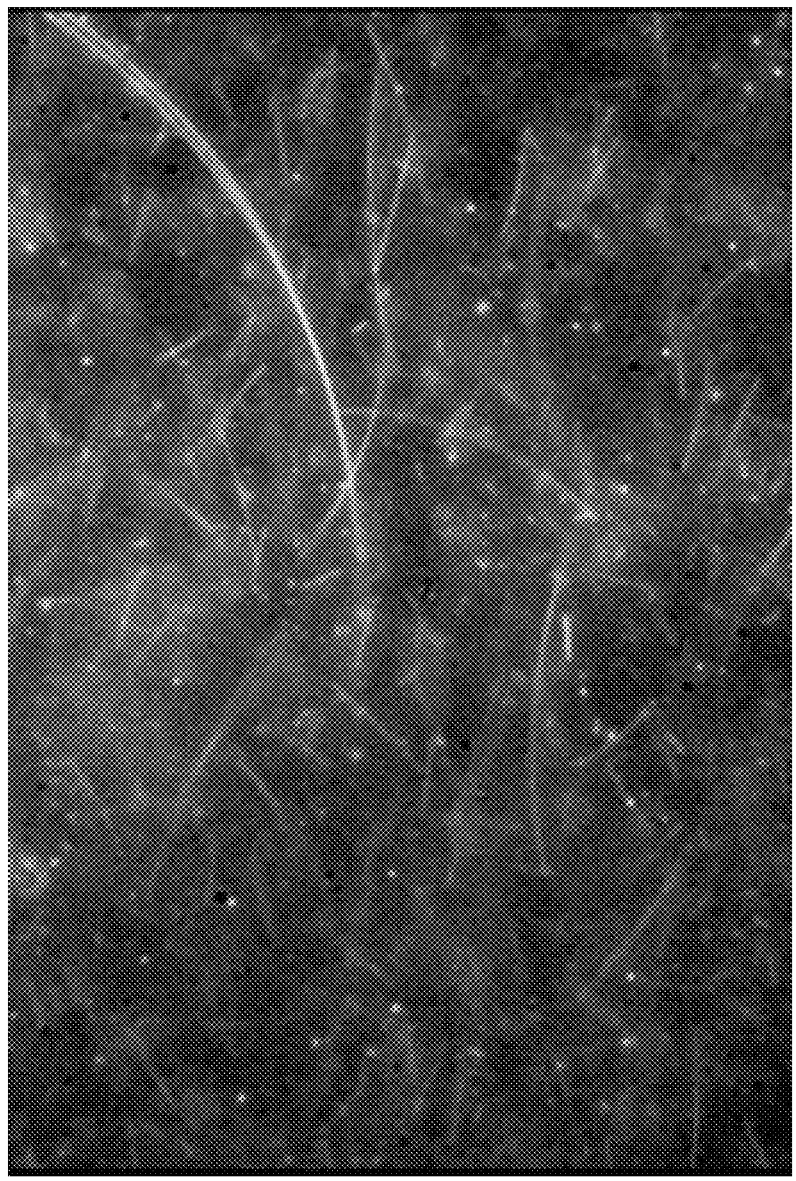
FIG. 11 shows an image of the silver nanowires of Example 9 produced with the addition of sodium hydroxide as seen with an optical microscope.

FIG. 11 shows an image of the nanowires of Example 9 as seen through optical microscopy. The average diameter of the nanowires of Example 9 was found to be about 57 nm, and the average length was found to be about 22 μm.

What is claimed is:

1. A process for making silver nanostructures, comprising reacting at least one polyol and at least one silver compound that is capable of producing silver metal when reduced, in the presence of:
   (a) a source of chloride or bromide ions, and
   (b) at least one copolymer that comprises:
      (i) one or more first constitutional repeating units that each independently comprise at least one pendant saturated or unsaturated, five-, six-, or seven-membered, acylamino- or diacylamino-containing heterocylic ring moiety per first constitutional repeating unit, and
      (ii) one or more second constitutional repeating units, each of which independently differs from the one or more first constitutional repeating units, the second constitutional repeating unit comprising at least one pendant cationic moiety that comprises a quaternary ammonium nitrogen atom and a nitrate counter anion, and has a molecular weight of greater than or equal to about 500 grams per mole.

2. The process of claim 1, wherein the first constitutional repeating units of the copolymer each independently comprise a pyrrolidonyl moiety or a pyrrolidinedionyl moiety.

3. The process of claim 2, wherein, wherein the copolymer is a random copolymer made by free radical polymerization of vinyl pyrrolidone, vinyl caprolactam, or vinyl pyrrolidone with one or more ethylenically unsaturated cationic monomers of the second constitutional repeating unit.

4. The process of claim 3, wherein the one or more ethylenically unsaturated cationic monomers of the second constitutional repeating unit are selected from the group consisting of diallyldimethylammonium nitrate, quaternized dimethylaminoethyl(meth)acrylate nitrate, and quaternized vinylimidazole nitrate.

5. The process of claim 4, wherein the copolymer is a random copolymer made by free radical polymerization of a monomer mixture comprising, based upon 1000 parts by weight of copolymer, from about 80 to less than 100 parts by weight of vinyl pyrrolidone and from greater than 0 to about 20 parts by weight of a diallyldimethylammonium nitrate.

6. The process of claim 1, wherein the at least one silver compound comprises silver nitrate, the at least one polyol comprises ethylene glycol, the total amount of silver nitrate added to the reaction mixture is from $1.5 \times 10^{-2}$ mole to about 1 mole silver nitrate per Liter of reaction mixture, and the reaction is conducted in the presence of, based on the weight of the reaction mixture, from about 0.1 wt % to about 20 wt % of the copolymer.

* * * * *